(12) United States Patent
Kwon et al.

(10) Patent No.: US 10,838,113 B2
(45) Date of Patent: Nov. 17, 2020

(54) DISPLAY DEVICE AND METHOD OF MANUFACTURING THE SAME

(71) Applicant: Samsung Display Co., Ltd., Yongin-Si (KR)

(72) Inventors: Seungwook Kwon, Hwaseong-si (KR); Ohjune Kwon, Hwaseong-si (KR); Hyojeong Kwon, Seoul (KR); Doohwan Kim, Yongin-si (KR); Minsang Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/901,596

(22) Filed: Feb. 21, 2018

(65) Prior Publication Data
US 2019/0033493 A1    Jan. 31, 2019

(30) Foreign Application Priority Data

Jul. 31, 2017   (KR) .......................... 10-2017-0097274

(51) Int. Cl.
 *G02B 1/14* (2015.01)
 *B32B 3/30* (2006.01)
 (Continued)

(52) U.S. Cl.
 CPC .................. *G02B 1/14* (2015.01); *B32B 3/30* (2013.01); *B32B 7/12* (2013.01); *B32B 27/08* (2013.01);
 (Continued)

(58) Field of Classification Search
 CPC ..... Y10T 428/24174; Y10T 428/24182; Y10T 428/24802; Y10T 428/24851; Y10T 428/24868; Y10T 428/24884; Y10T 428/24942; Y10T 428/2495; Y10T 428/24959; Y10T 428/24967; Y10T 428/24975; Y10T 428/26; Y10T 428/261; Y10T 428/263; Y10T 428/265; Y10T 428/266; Y10T 428/268; Y10T 428/269; Y10T 428/27; Y10T 428/273; Y10T 428/28; Y10T 428/2809; Y10T 428/2848;
 (Continued)

(56) References Cited

U.S. PATENT DOCUMENTS

| 5,325,583 A | 7/1994 | Shimizu et al. |
| 9,614,168 B2 | 4/2017 | Zhang et al. |

(Continued)

FOREIGN PATENT DOCUMENTS

| KR | 19940004052 | 5/1994 |
| KR | 1020150019876 | 2/2015 |
| KR | 1020150094989 | 8/2015 |

*Primary Examiner* — Maria V Ewald
*Assistant Examiner* — Ethan A. Utt
(74) *Attorney, Agent, or Firm* — Cantor Colburn LLP

(57) ABSTRACT

A display device includes a display panel which includes a bending area which is bendable and includes a curvature area in a bent state, a protective film by which a first groove is defined, where the first groove corresponds to the curvature area, and an adhesive member disposed between the protective film and the display panel. The protective film includes a first inner side surface and a second inner side surface that define the first groove, and the first inner side surface and the second inner side surface have inclined shapes.

18 Claims, 22 Drawing Sheets

(51) Int. Cl.
*B32B 7/12* (2006.01)
*B32B 27/36* (2006.01)
*B32B 37/10* (2006.01)
*B32B 38/10* (2006.01)
*B32B 27/08* (2006.01)
*B32B 38/00* (2006.01)
*B32B 37/12* (2006.01)

(52) U.S. Cl.
CPC .............. *B32B 27/36* (2013.01); *B32B 37/10* (2013.01); *B32B 38/004* (2013.01); *B32B 38/10* (2013.01); *B32B 37/12* (2013.01); *B32B 2457/20* (2013.01)

(58) Field of Classification Search
CPC ........... Y10T 428/2852; Y10T 428/287; Y10T 428/2874; Y10T 428/2896; Y10T 428/31786; Y10T 428/24479; Y10T 428/24488; Y10T 428/24496; Y10T 428/24504; Y10T 428/2457; Y10T 428/24579; Y10T 428/24612; Y10T 428/23; Y10T 428/239; Y10T 428/24355; B32B 3/00; B32B 3/02; B32B 3/08; B32B 3/085; B32B 3/10; B32B 3/14; B32B 3/16; B32B 3/18; B32B 3/22; B32B 3/26; B32B 3/30; B32B 7/00; B32B 7/04; B32B 7/05; B32B 7/12; B32B 7/14; B32B 27/00; B32B 27/04; B32B 27/06; B32B 27/08; B32B 27/36; B32B 2457/20; B32B 2457/202; B32B 2457/204; B32B 2457/206; B32B 2457/208; B32B 3/263; G02B 1/00; G02B 1/04; G02B 1/10; G02B 1/105; G02B 1/14; H05K 1/00; H05K 1/02; H05K 1/0277; H05K 1/0278; H05K 1/028; H05K 1/0281; G02F 1/1333; G02F 1/133305; G06F 1/16; G06F 1/1652
USPC ............ 428/119, 120, 195.1, 201, 203, 205, 428/212–216, 219, 220, 332–341, 343, 428/345, 354, 355 R, 355 EP, 355 AK, 428/355 N, 480, 156–159, 167, 168, 172, 428/68, 76, 141; 42/212–216, 219, 220
See application file for complete search history.

(56) References Cited

U.S. PATENT DOCUMENTS

| | | | |
|---|---|---|---|
| 2008/0055831 A1* | 3/2008 | Satoh | G02F 1/133305 428/141 |
| 2015/0146386 A1* | 5/2015 | Namkung | G02F 1/133305 361/749 |
| 2015/0227172 A1 | 8/2015 | Namkung et al. | |
| 2017/0042047 A1* | 2/2017 | Oh | G02F 1/133305 |
| 2017/0179423 A1* | 6/2017 | Kwon | G02F 1/133305 |

* cited by examiner

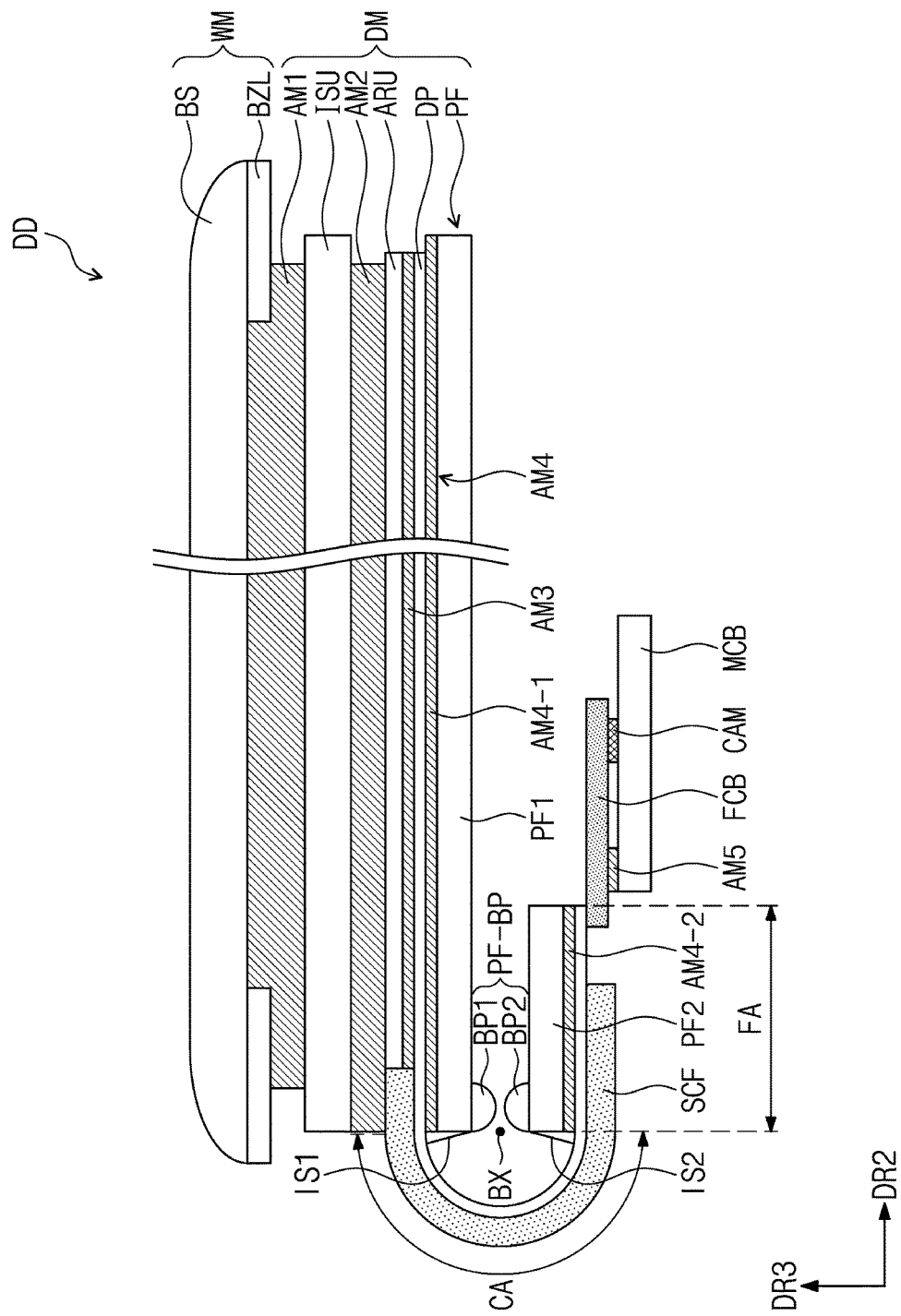

DISPLAY DEVICE AND METHOD OF MANUFACTURING THE SAME

This application claims priority to Korean Patent Application No. 10-2017-0097274, filed on Jul. 31, 2017, and all the benefits accruing therefrom under 35 U.S.C. § 119, the content of which in its entirety is herein incorporated by reference.

BACKGROUND

1. Field

Exemplary embodiments of the invention relate to a display device and a method of manufacturing the same and, more particularly, to a display device with improved bending characteristics and a method of manufacturing the same.

2. Description of the Related Art

An electronic device such as a smart phone, a tablet, a notebook computer, and a smart television has been developed. This electronic device includes a display device to show information. The electronic device further includes various electronic modules in addition to the display device.

To realize a slim bezel, the electronic device may include a display device of which a portion is bent.

SUMMARY

Bending stress may be applied to the display device in a process of bending the display device, and thus faulty products may occur. Exemplary embodiments of the invention may provide a display device capable of improving bending characteristics.

Exemplary embodiments of the invention may also provide a method of manufacturing a display device, which is capable of improving process efficiency.

According to an exemplary embodiment of the invention, a display device includes a display panel, a protective film, and an adhesive member.

In this case, the display panel includes a non-bending area and a bending area which is bendable from the non-bending area, and the bending area includes a curvature area having a predetermined curvature and a facing area facing the non-bending area in a bent state.

In this case, the protective film is disposed on a rear surface of the display panel and includes a thermoplastic resin, and a first groove is defined by the protective film and corresponds to the curvature area.

In this case, the adhesive member is disposed between the protective film and the display panel.

In this case, the protective film includes a first inner side surface and a second inner side surface that define the first groove, and the first inner side surface and the second inner side surface are inclined.

In an exemplary embodiment of the invention, a portion of a rear surface of the adhesive member, which corresponds to the curvature area, may be exposed outward.

In an exemplary embodiment, a rear surface of the protective film may include a first rear surface and a second rear surface, and the first groove is defined therebetween. The protective film may include a bump portion that protrudes from the first rear surface and the second rear surface adjacent to the first groove.

In an exemplary embodiment of the invention, a second groove may be defined by the adhesive member, and corresponds to the curvature area. In this case, a portion of the rear surface of the display panel, which corresponds to the curvature area, may be exposed outward.

In an exemplary embodiment, the display device may further include at least one pattern disposed on the portion, corresponding to the curvature area, of the rear surface of the adhesive member.

In an exemplary embodiment, a thickness of the pattern in a third direction perpendicular to the rear surface of the adhesive member may range from about 20% to about 40% of a thickness of the protective film. The first groove may extend in a first direction, and the pattern may be provided in plurality.

In an exemplary embodiment, each of the plurality of patterns may extend in a second direction perpendicular to the first direction in a stretched-out state, and the patterns may be spaced apart from each other.

In an exemplary embodiment, each of the plurality of patterns may extend in the first direction, and the patterns may be spaced apart from each other.

In an exemplary embodiment, the at least one pattern may have a hemispherical shape.

In an exemplary embodiment, the thermoplastic resin may include polyethylene terephthalate ("PET").

According to an exemplary embodiment of the invention, a method of manufacturing a display device includes providing preliminary display device that comprises a display panel including a first area and a second area connected to the first area, an adhesive member disposed on a rear surface of the display panel, and a protective film disposed on a rear surface of the adhesive member, and pressing the protective film using a heating block and removing a partial region, of the protective film, which corresponds to a portion of the second area, where the second area is bendable.

In an exemplary embodiment, the protective film may include a thermoplastic resin, and the heating block may be heated to a temperature higher than or equal to a sublimation temperature of the thermoplastic resin.

In an exemplary embodiment, a region from which the protective film is removed may be defined as a groove, the protective film may include a first inner side surface and a second inner side surface that define the groove, and the first inner side surface and the second inner side surface may have inclined shapes.

In an exemplary embodiment, a region from which the protective film is removed may be defined as a groove, and pressing of the protective film using the heating block may include forming a bump portion protruding from a rear surface of the protective film adjacent to the groove.

In an exemplary embodiment, the method may further include removing the bump portion.

In an exemplary embodiment, a concave portion may be defined at a bottom surface of the heating block, which comes in contact with a region in which the protective film is pressed. In this case, pressing the protective film may further comprise forming a pattern corresponding to the concave portion on the rear surface of the adhesive member.

In an exemplary embodiment, pressing the protective film comprises removing a partial region, of the adhesive member, which corresponds to the portion of the second area.

In an exemplary embodiment, the second area in a bent state may include a curvature area having a predetermined curvature and a facing area facing the first area in a thickness direction of the display panel. Here, the curvature area corresponds to the portion of the second area.

BRIEF DESCRIPTION OF THE DRAWINGS

The above and other advantages and features of the invention will become more apparent by describing in further detail exemplary embodiments thereof with reference to the accompanying drawings, in which:

FIG. 2C is a second side view illustrating an exemplary embodiment of a display device according to the invention.

DETAILED DESCRIPTION

Figure 1:
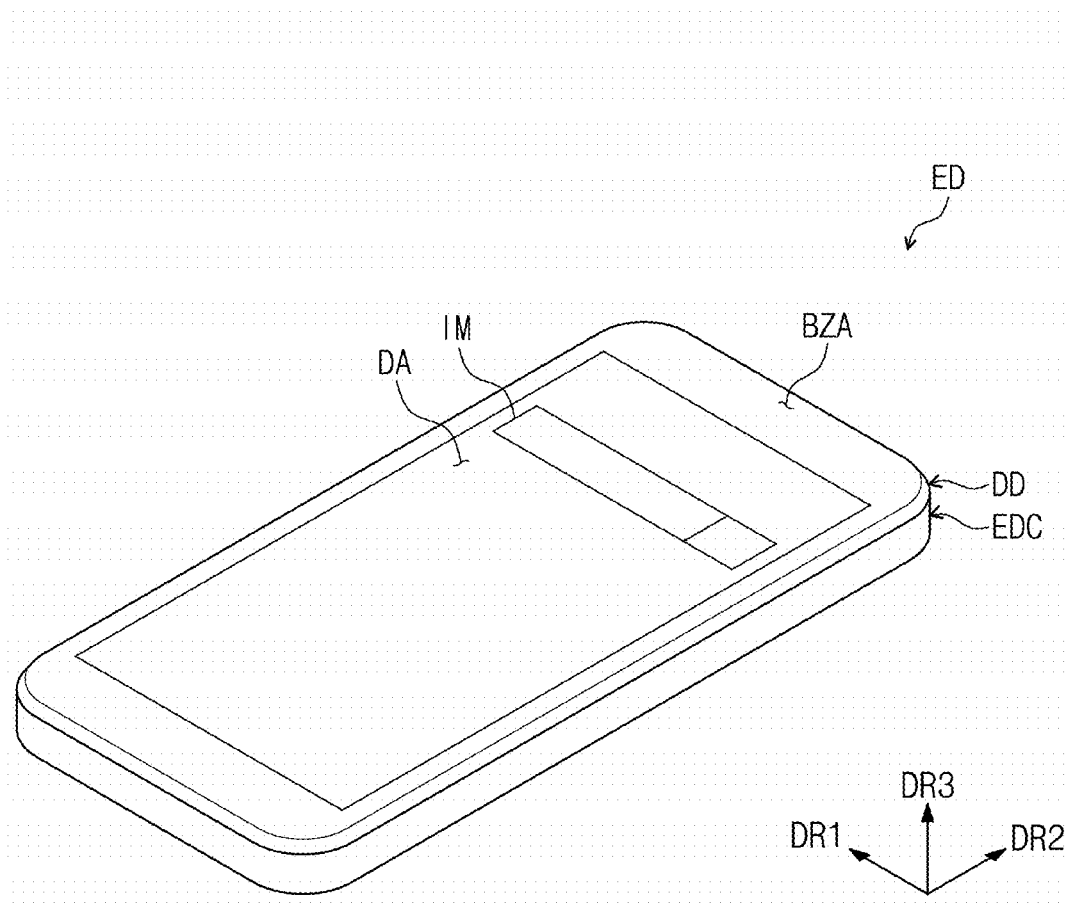
FIG. 1 is a front perspective view illustrating an exemplary embodiment of an electronic device according to the invention.

The invention now will be described more fully hereinafter with reference to the accompanying drawings, in which various exemplary embodiments are shown. This invention may, however, be embodied in many different forms, and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular exemplary embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is a front perspective view illustrating an exemplary embodiment of an electronic device ED according to the invention.

Referring to FIG. 1, a smart phone is illustrated as an electronic device ED in this exemplary embodiment. However, an electronic device according to the invention is not limited thereto. In certain exemplary embodiments, the electronic device ED may be a tablet, a notebook computer, or a smart television.

As illustrated in FIG. 1, a display surface, on which an image IM is displayed, is parallel to a plane defined by a first directional axis DR1 and a second directional axis DR2. The display surface may include a display area DA and a bezel area BZA adjacent to the display area DA. In FIG. 1, an internet search engine is illustrated as an example of the image IM. In an exemplary embodiment, for example, the display area DA may have a quadrilateral shape. The bezel area BZA may surround the display area DA. In other words, the bezel area BZA forms a border of the display surface. In certain exemplary embodiments of the invention, the bezel area BZA may be disposed in only two areas opposite to each other in the first directional axis DR1 or in only two areas opposite to each other in the second directional axis DR2.

A normal direction of the display surface (i.e., a thickness direction of the electronic device ED) is parallel to a third directional axis DR3. A front surface (different names: a top surface, a first surface) and a rear surface (different names: a bottom surface, a second surface) of each member are defined with respect to a direction in which the image IM is displayed. That is, a front surface of a member is a surface of the member disposed in a direction in which the image IM is displayed in a stretched-out state and a rear surface of the member is an opposite surface of the member. In other words, among two surfaces of a member, a surface which is closer to the display surface shown in FIG. 1 is a front surface of the member, and a surface which is farther from the display surface is a rear surface of the member in a stretched-out state. Hereinafter, first to third directions mean the directions indicated by the first to third directional axes DR1, DR2, and DR3, respectively, and are indicated by the same reference designators as the first to third directional axes DR1, DR2, and DR3. Each of the first to third directions may indicate either direction of two opposite directions parallel to the corresponding directional axis among the first to third directional axes DR1, DR2, and DR3 unless stated otherwise.

The electronic device ED may include a display device DD and an outer case EDC. The display device DD will be described later.

The outer case EDC may be coupled to the display device DD. The outer case EDC may provide an outer surface of the electronic device ED. In this exemplary embodiment of FIG. 1, the outer case EDC in one unitary body is illustrated as an example. However, an outer case according to the invention are not limited thereto. In an exemplary embodiment, the outer case EDC may include a plurality of bodies assembled with each other. In an exemplary embodiment, the outer case EDC may include a plurality of frames and/or plates which may include or be formed of glass, plastic, and/or a metal.

Figure 2A:
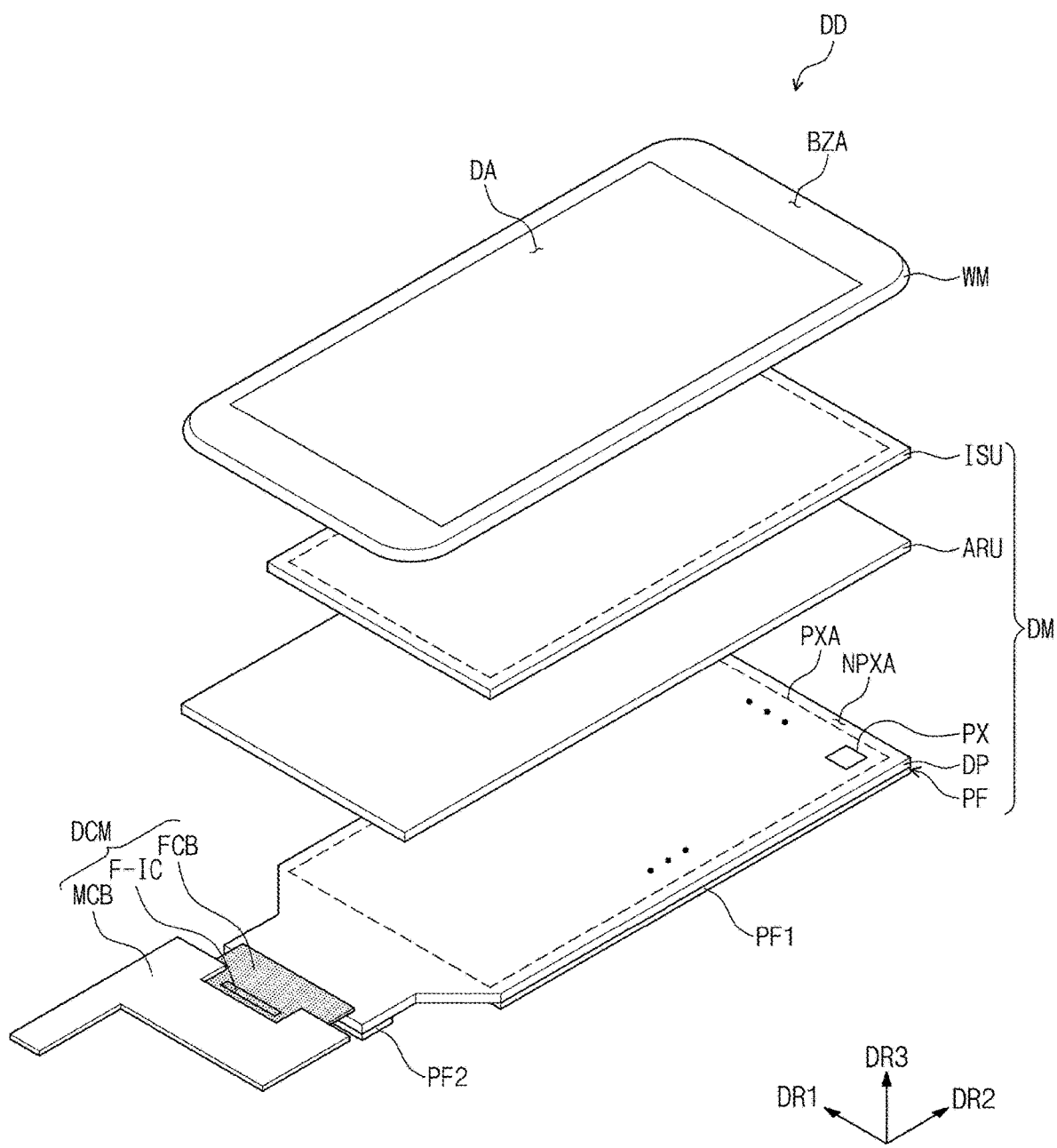
FIG. 2A is an exploded perspective view illustrating an exemplary embodiment of a display device according to the invention.
Figure 2B:
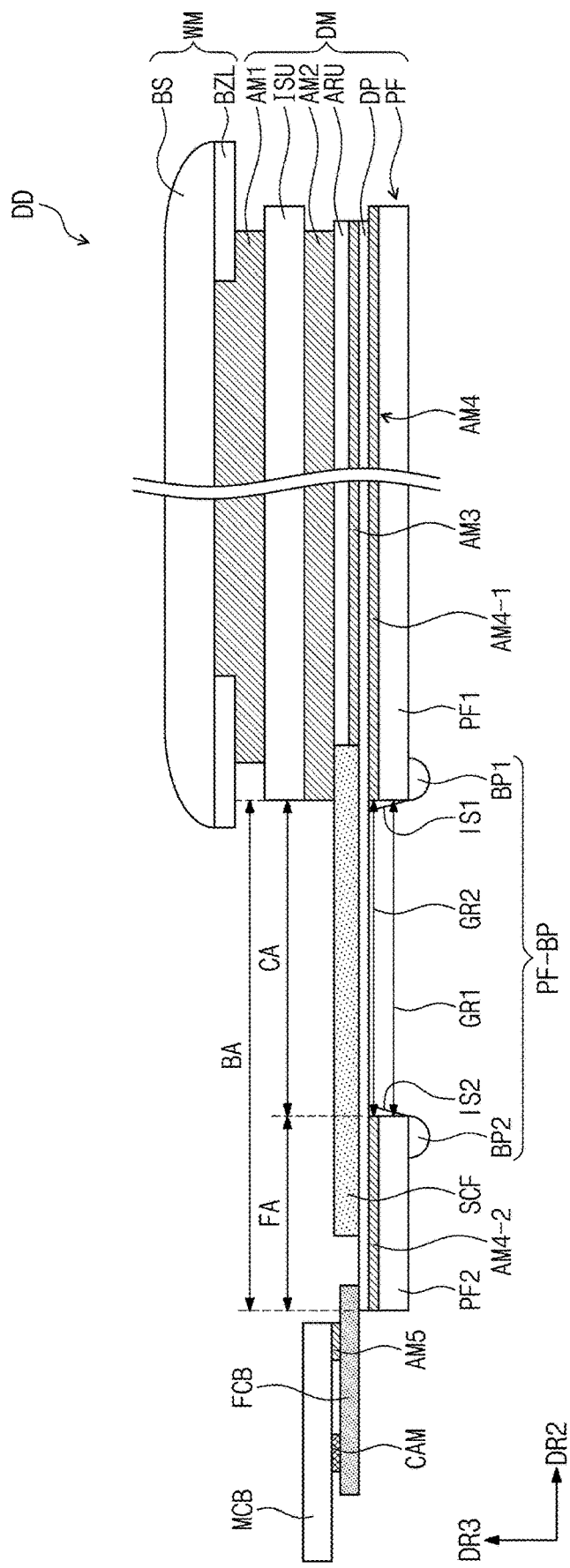
FIG. 2B is a first side view illustrating an exemplary embodiment of a display device according to the invention.
Figure 2D:
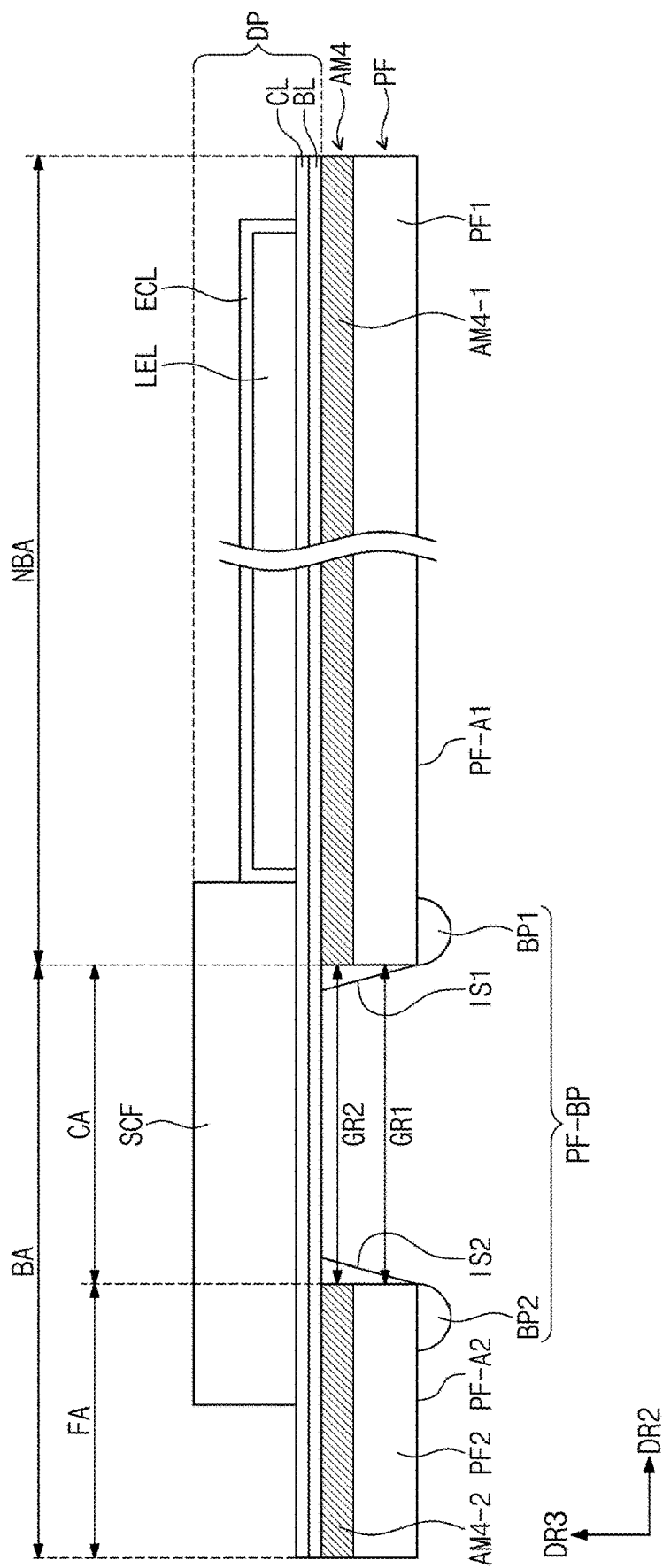
FIG. 2D is a cross-sectional view illustrating an exemplary embodiment of a display module according to the invention.
Figure 2E:
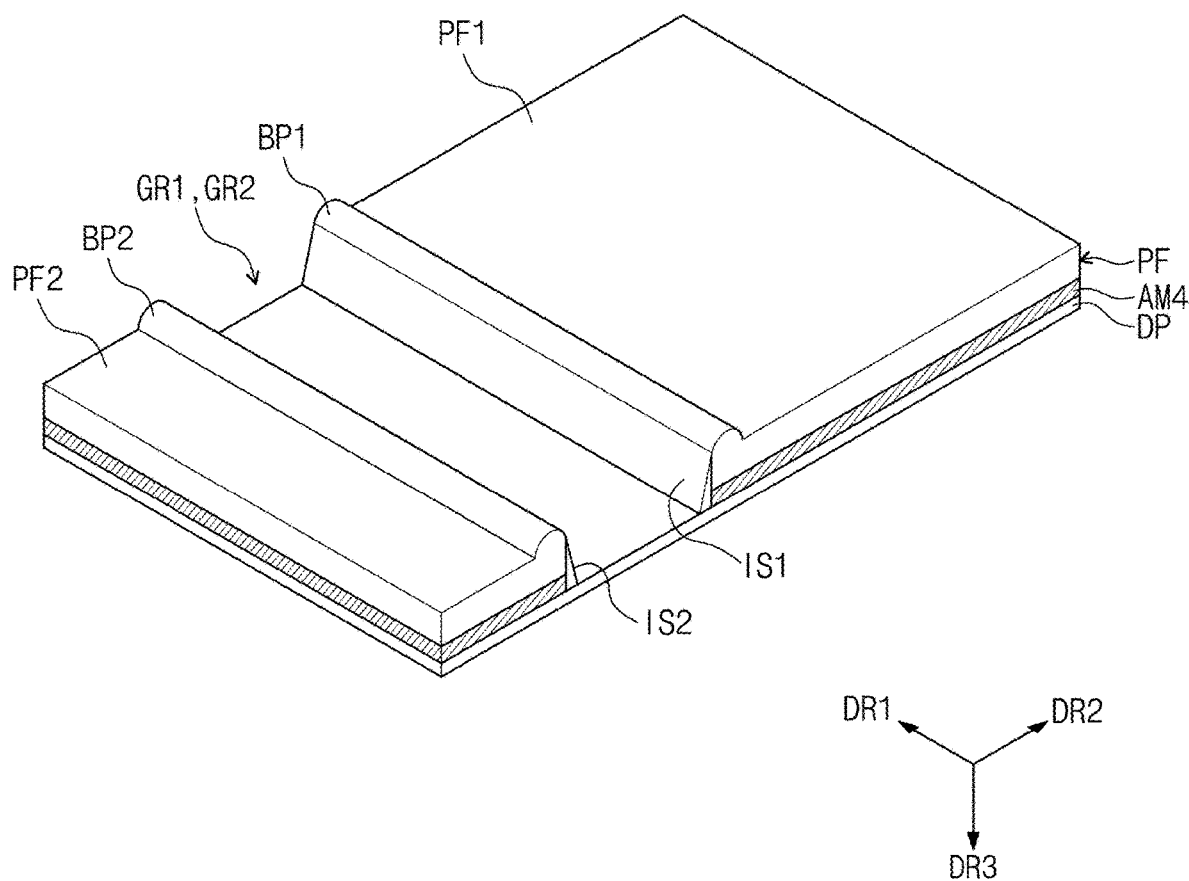
FIG. 2E is a rear perspective view illustrating an exemplary embodiment of a display module according to the invention.

FIG. 2A is an exploded perspective view illustrating an exemplary embodiment of a display device DD according to the invention. FIG. 2B is a first side view illustrating an exemplary embodiment of the display device DD according to the invention, and FIG. 2C is a second side view illustrating an exemplary embodiment of the display device DD according to the invention. FIG. 2D is a cross-sectional view illustrating an exemplary embodiment of a display module according to the invention, and FIG. 2E is a rear perspective view illustrating an exemplary embodiment of a display module according to the invention. Hereinafter, an exemplary embodiment of the display device DD according to the invention will be described with reference to the drawings.

As illustrated in FIGS. 2A to 2C, the display device DD may include a window member WM and a display module DM. The window member WM includes a base member BS and a bezel layer BZL disposed on a rear surface of the base member BS. An area in which the bezel layer BZL is disposed may be defined as the bezel area BZA illustrated in FIG. 1. In this exemplary embodiment, a flat window member WM is illustrated in the display area DA. However, the shape of the window member WM may be variously modified. In certain exemplary embodiments, edges of the window member WM, which are opposite to each other in the first direction DR1, may have curved surfaces.

The base member BS may include a glass substrate, a sapphire substrate, or a plastic substrate. The base member BS may have a single-layered or multi-layered structure. In an exemplary embodiment, for example, the base member BS may include a plurality of plastic films coupled to each other by an adhesive. In an exemplary embodiment, the base member BS may include a glass substrate and a plastic film coupled to the glass substrate by an adhesive member.

The bezel layer BZL may have a single-layered or multi-layered structure. In an exemplary embodiment, the multi-layered bezel layer BZL may include a buffer layer for improving adhesive strength, a pattern layer for providing a predetermined pattern, and an achromatic color layer. The pattern layer may provide a pattern referred to as 'a hairline'. The achromatic color layer may include an organic mixture including a black pigment or dye. The layers included in the multi-layered bezel layer BZL may be formed by a deposition process, a printing process, and/or a coating process. Even though not shown in the drawings, the window member WM may further include a functional coating layer disposed on a front surface of the base member BS. In an exemplary embodiment, the functional coating layer may include at least one of an anti-fingerprint layer, an anti-reflection layer, or a hard coating layer.

As illustrated in FIGS. 2A to 2C, the display module DM may include a display panel DP, an input sensing unit ISU, an anti-reflection unit ARU, a protective film PF, and a driving control module DCM. FIG. 2B illustrates the display panel DP that is stretched out, and FIG. 2C illustrates the display panel DP that is bent.

The display panel DP may be a flexible display panel, for example, an organic light-emitting display panel. In a plan view, the display panel DP includes a pixel area PXA in which pixels PX are disposed, and a non-pixel area NPXA adjacent to the pixel area PXA. The pixels PX are not disposed in the non-pixel area NPXA, but peripheral components such as signal lines and banks are disposed in the non-pixel area NPXA. The pixel area PXA and the non-pixel area NPXA may correspond to the display area DA and the bezel area BZA of FIG. 1, respectively. However, shapes and/or areas of the pixel area PXA and the non-pixel area NPXA may not be completely the same as those of the display area DA and the bezel area BZA.

The input sensing unit ISU may obtain coordinate information of an external input. The input sensing unit ISU may sense at least one of various kinds of inputs provided from the outside of the electronic device ED. In an exemplary embodiment, for example, the input sensing unit ISU may sense an input by a body of a user and/or may sense or recognize at least one of various external inputs such as light, heat, and pressure. In addition, the input sensing unit ISU may sense a proximity input by getting close to a sensing surface as well as a direct input by contacting the sensing surface.

The anti-reflection unit ARU may include a polarizing film and/or a phase retardation film. The number of the phase retardation film and a phase retardation length (e.g., λ/4 or λ/2) of the phase retardation film may be determined depending on an operating principle of the anti-reflection unit ARU. The anti-reflection unit ARU may include color filters.

The protective film PF is disposed on a rear surface of the display panel DP. In this exemplary embodiment shown in FIG. 2B, a groove GR1 (hereinafter, referred to as "a first groove") corresponding to a curvature area CA is defined in the protective film PF. The first groove GR1 may extend in the first direction DR1.

Figure 6A:
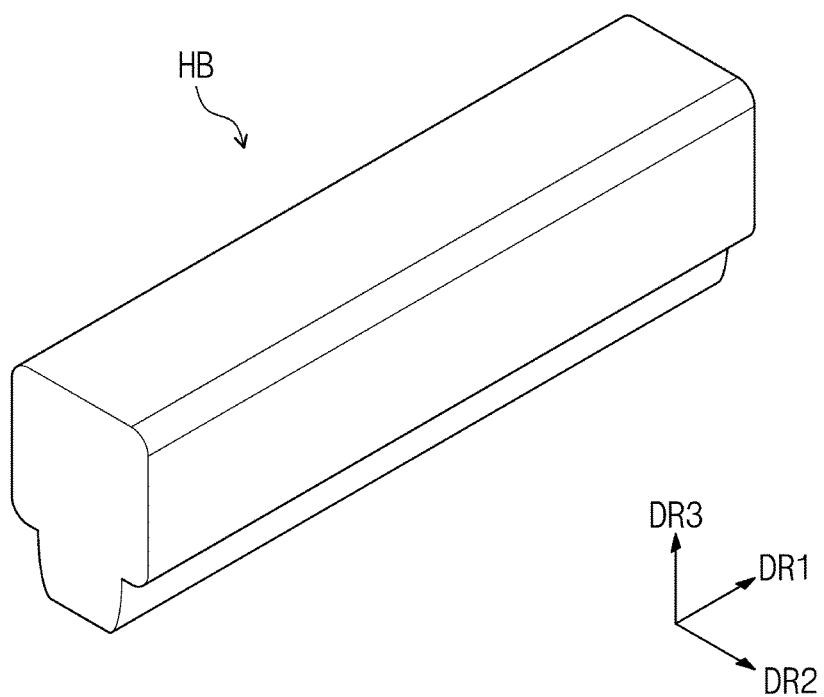
FIG. 6A is a rear perspective view illustrating an exemplary embodiment a heating block according to the invention.

The first groove GR1 may be formed by a heating block HB of FIG. 6A. The first groove GR1 is defined as an area from which at least a portion of the protective film PF is removed. A process of forming the first groove GR1 will be described later in more detail.

The protective film PF may include a first protective film PF1 and a second protective film PF2 that are spaced apart from each other, and the first groove GR1 is defined therebetween.

The protective film PF may include a plastic film as a base layer. In an exemplary embodiment, the protective film PF may include a plastic film including a thermoplastic resin, for example, one of polyethylene terephthalate ("PET"), polyethylene ("PE"), polyvinylchloride ("PVC"), polypropylene ("PP"), polystyrene ("PS"), polyacrylonitrile ("PAN"), styrene-acrylonitrile copolymer ("SAN"), acrylonitrile-butadiene-styrene ("ABS"), and polymethyl methacrylate ("PMMA"), or any combination thereof. In particular, PET has excellent heat resistance and excellent fatigue strength and electrical characteristics and is less affected by temperature and humidity.

The material of the protective film PF according to the invention is not limited to the plastic resins, but may include an organic/inorganic composite material. In an exemplary embodiment, for example, the protective film PF may include a porous organic layer and an inorganic material filling pores of the porous organic layer.

The driving control module DCM may include a first circuit substrate (or a driving circuit substrate) MCB, a second circuit substrate FCB connecting the first circuit substrate MCB to the display panel DP, and a driving chip F-IC mounted on the second circuit substrate FCB. Even though not shown in the drawings, a plurality of passive elements and active elements may be mounted on the first circuit substrate MCB. The first circuit substrate MCB may be a rigid or flexible circuit substrate, and the second circuit substrate FCB may be a flexible circuit substrate.

In this exemplary embodiment shown in FIG. 2B, the input sensing unit ISU and the anti-reflection unit ARU are provided separately. Alternatively, at least one of the input sensing unit ISU and the anti-reflection unit ARU may be omitted. In an exemplary embodiment, at least one of the input sensing unit ISU and the anti-reflection unit ARU may be integrated with the display panel DP as a single unitary unit by continuous processes of manufacturing.

Hereinafter, the display module DM will be described in more detail with reference to FIGS. 2A to 2E. In an exemplary embodiment, each of first to fifth adhesive members AM1 to AM5 to be described below may be a pressure sensitive adhesive film ("PSA"), an optically clear adhesive film ("OCA"), or an optically clear resin ("OCR"). The first to fifth adhesive members AM1 to AM5 may include, but not limited to, a photo-curing adhesive material or a thermosetting adhesive material. In certain exemplary embodiments, one or more of the first to fifth adhesive members AM1 to AM5 may be omitted.

The input sensing unit ISU may be disposed on a rear surface of the window member WM. The window member WM and the input sensing unit ISU may be coupled to each other by the first adhesive member AM1 interposed therebetween. The anti-reflection unit ARU may be disposed on a rear surface of the input sensing unit ISU. The input sensing unit ISU and the anti-reflection unit ARU may be coupled to each other by the second adhesive member AM2 interposed therebetween. The display panel DP may be disposed on a rear surface of the anti-reflection unit ARU. The anti-reflection unit ARU and the display panel DP may be coupled to each other by the third adhesive member AM3 interposed therebetween. The third adhesive member AM3 may be thinner than the first adhesive member AM1 and the second adhesive member AM2. In certain exemplary embodiments, the positions of the anti-reflection unit ARU and the input sensing unit ISU may be interchanged.

The display panel DP is illustrated as a single-layered structure in FIGS. 2B and 2C. However, as illustrated in FIG. 2D, the display panel DP may have a multi-layered structure including a base layer BL, a circuit layer CL, an element layer LEL, and an encapsulation layer ECL in an exemplary embodiment.

The base layer BL may be a resin layer and may include, but not limited to, polyimide ("PI"). The circuit layer CL may be disposed on a front surface of the base layer BL. The circuit layer CL may have a multi-layered structure including an insulating layer, a conductive layer, and a semiconductor layer. The circuit layer CL includes a pixel circuit including a thin film transistor and signal lines connected to the pixel circuit.

The element layer LEL may be disposed on a front surface of the circuit layer CL. The element layer LEL may include a light-emitting element, e.g., an organic light-emitting element. The encapsulation layer ECL is disposed on the element layer LEL to encapsulate the element layer LEL. The encapsulation layer ECL may have a multi-layered structure including an organic layer and an inorganic layer, called 'a thin film encapsulation ("TFE")'. In certain exemplary embodiments, the encapsulation layer ECL may include only one of an inorganic layer and an organic layer. In other exemplary embodiments, the display panel DP may include an encapsulation substrate and a sealant, which are substituted for the encapsulation layer ECL. The sealant may couple the encapsulation substrate onto the element layer LEL.

The display panel DP and the protective film PF may be coupled to each other by the fourth adhesive member AM4 therebetween. A rear surface of the base layer BL and the front surface of the protective film PF may be coupled to each other by the fourth adhesive member AM4. The fourth adhesive member AM4 may include a first adhesive portion AM4-1 and a second adhesive portion AM4-2 that correspond to the first protective film PF1 and the second protective film PF2, respectively.

As illustrated in FIG. 2D, the display panel DP may include two areas. Since the display panel DP is capable to be bent as illustrated in FIG. 2C, the display panel DP may include a non-bending area NBA and a bending area BA. The bending area BA may include a curvature area CA and a facing area FA. The curvature area CA may have a predetermined curvature in the state in which the display panel DP is bent, and the facing area FA may face the non-bending area NBA in the state in which the display panel DP is bent.

The base layer BL and the circuit layer CL may be disposed to correspond to both the non-bending area NBA and the bending area BA. In contrast, the element layer LEL and the encapsulation layer ECL may be disposed only in the non-bending area NBA.

The first protective film PF1 may correspond to the non-bending area NBA. The first adhesive portion AM4-1 may couple the non-bending area NBA of the base layer BL and the first protective film PF1 to each other. The second protective film PF2 and the second adhesive portion AM4-2 may correspond to the facing area FA. The first protective film PF1 and the second protective film PF2 are spaced apart from each other, and the first groove GR1 corresponding to the curvature area CA is interposed between the first protective film PF1 and the second protective film PF2.

The first protective film PF1 includes a first inner side surface IS1, and the second protective film PF2 includes a second inner side surface IS2. The first groove GR1 is defined by the first and second inner side surfaces IS1 and IS2. The first inner side surface IS1 and the second inner side surface IS2 are spaced apart from each other in the second direction DR2 and face each other in the second direction DR2. The first inner side surface IS1 and the second inner side surface IS2 may be inclined surfaces. A distance between the first and second inner side surfaces IS1 and IS2 in the second direction DR2 increases from the rear surface of the display panel DP in the third direction DR3 which is from the fourth adhesive member AM4 to the protective film PF.

The protective film PF may include a bump portion PF-BP protruding from a rear surface of the protective film PF. The bump portion PF-BP may include a first bump portion BP1 protruding from a first rear surface PF-A1 of the first protective film PF1 and a second bump portion BP2 protruding from a second rear surface PF-A2 of the second protective film PF2. The first and second bump portions BP1 and BP2 may be adjacent to the first groove GR1. The first bump portion BP1 and the second bump portion BP2 may be removed.

The display panel DP may further include a stress control film SCF that is disposed on the circuit layer CL to correspond to at least the curvature area CA. In an exemplary embodiment, the stress control film SCF may be disposed on the display panel DP as a separate member as shown in FIG. 2B. In certain exemplary embodiments, portions of the stress control film SCF may overlap with the non-bending area NBA and the facing area FA. The stress control film SCF may include a plastic film, like the protective film PF. A neutral plane of the curvature area CA, which is defined in the bending of the display panel DP, may be adjacent to the circuit layer CL by the stress control film SCF.

Referring again to FIGS. 2B and 2C, the curvature area CA may be disposed between the facing area FA and the non-bending area NBA in the state in which the display panel DP is stretched out. The facing area FA may face the non-bending area NBA in the thickness direction DR3 of the display module DM in the state in which the display panel DP is bent. In the bent state, a predetermined radius of curvature is defined with respect to a bending axis BX extending in the first direction DR1 in the bending area BA.

Pads of the circuit layer CL may be aligned with one side of the facing area FA. The second circuit substrate FCB is connected to the display panel DP in the facing area FA. In the bent state, the first circuit substrate MCB and the second circuit substrate FCB face the rear surface of the display panel DP.

Since the first groove GR1 is defined by the protective film PF as corresponds to the curvature area CA, it is possible to reduce or minimize stress occurring at the circuit layer CL when the display panel DP is bent.

In an exemplary embodiment of the invention, a second groove GR2 may be defined by the fourth adhesive member AM4 and correspond to the curvature area CA. In this case, a portion of the rear surface of the display panel DP, which corresponds to the curvature area CA, may be exposed to the outside. Here, the outside is not the outside of the electronic device ED but is the outside of the display module DM in an inner space of the electronic device ED. The fourth adhesive member AM4 may include the first adhesive portion AM4-1 and the second adhesive portion AM4-2 which are spaced apart from each other and the second groove GR2 is defined therebetween.

The first circuit substrate MCB and the second circuit substrate FCB may be coupled to each other in the third direction DR3 by a conductive member CAM and the fifth adhesive member AM5 that are disposed between the first and second circuit substrates MCB and FCB. The conductive member CAM electrically connects the first and second circuit substrates MCB and FCB to each other and physically couples the first and second circuit substrates MCB and FCB to each other. The fifth adhesive member AM5 may reduce stress which occurs at the conductive member CAM in the process of bending the display panel DP.

In some exemplary embodiments of the invention, the protective film PF may include patterns PT in the curvature area CA (see FIGS. 3A to 5B). The patterns PT may be thinner than the protective film PF in other area or partially fill the curvature area CA. Hereinafter, the patterns PT will be described with reference to the drawings.

Figure 3A:
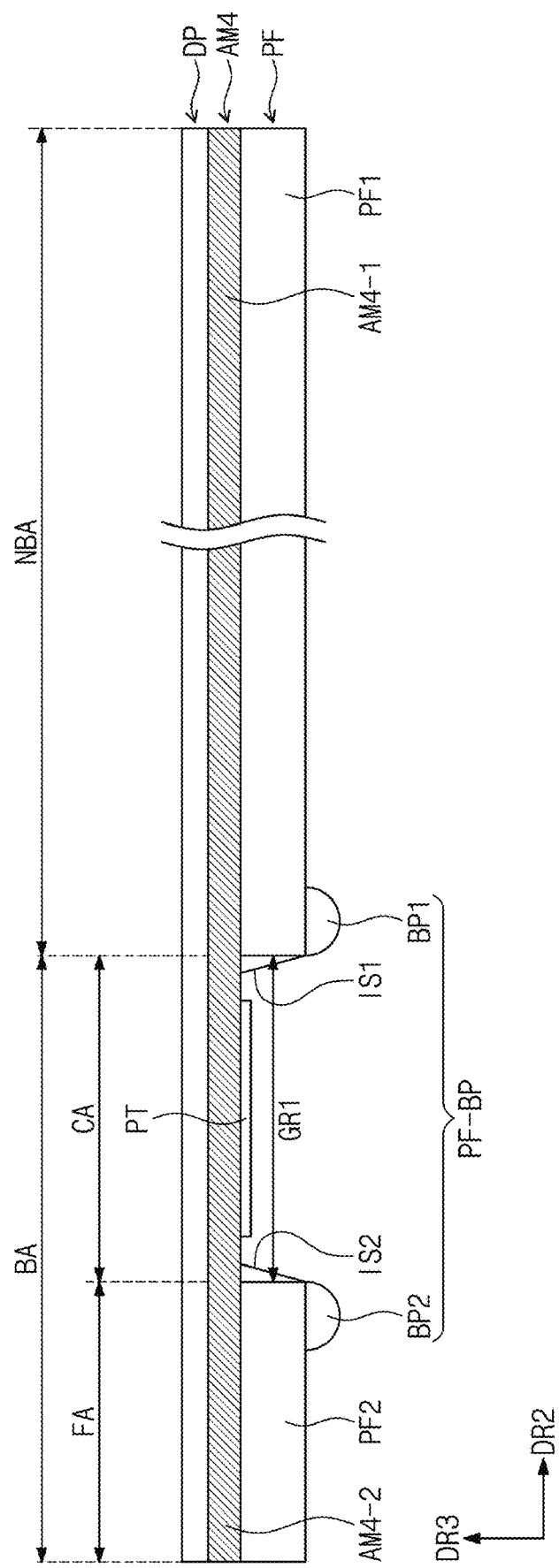
FIG. 3A is a cross-sectional view illustrating an exemplary embodiment of a display module according to the invention.
Figure 3B:
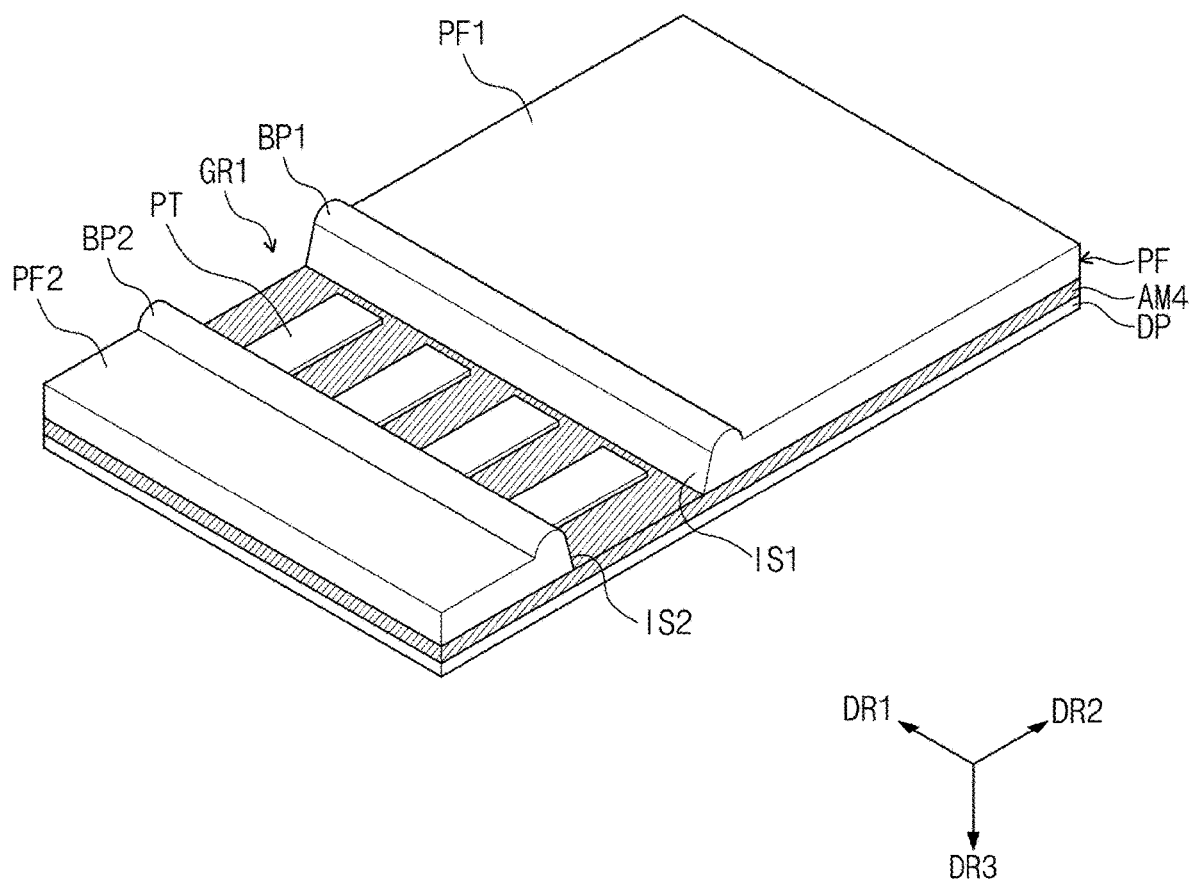
FIG. 3B is a rear perspective view illustrating an exemplary embodiment a display module according to the invention.

FIG. 3A is a cross-sectional view illustrating an exemplary embodiment of a display module according to the invention, and FIG. 3B is a rear perspective view illustrating an exemplary embodiment of a display module according to the invention.

Referring to FIGS. 3A and 3B, a portion, corresponding to the curvature area CA, of a rear surface of a fourth adhesive member AM4 may be exposed outward by the first groove GR1. Patterns PT may be disposed on the portion, corresponding to the curvature area CA, of the rear surface of the fourth adhesive member AM4. In an exemplary embodiment, thicknesses of the patterns PT in the third direction DR3 may be about 30% of a thickness of each of the first and second protective films PF1 and PF2.

In this exemplary embodiment, the patterns PT may extend in the second direction DR2 and may be spaced apart from each other in the first direction DR1. Since the patterns PT extend in the second direction DR2, it is possible to reduce stress that occurs at signal lines crossing over the curvature area CA of the display panel DP in the process of bending the display panel DP.

The patterns PT may have various shapes and may be variously disposed. Hereinafter, other various shapes and arrangement of the patterns PT will be described with reference to the drawings.

Figure 4A:
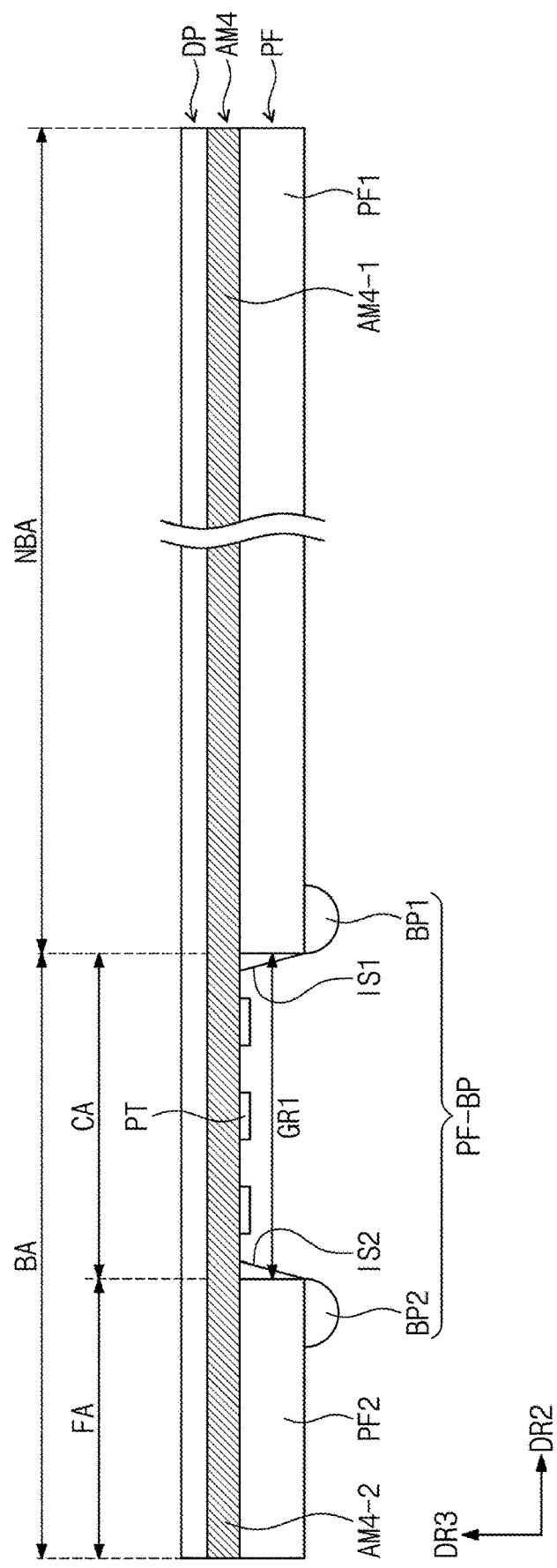
FIG. 4A is a cross-sectional view illustrating an exemplary embodiment a display module according to the invention.
Figure 4B:
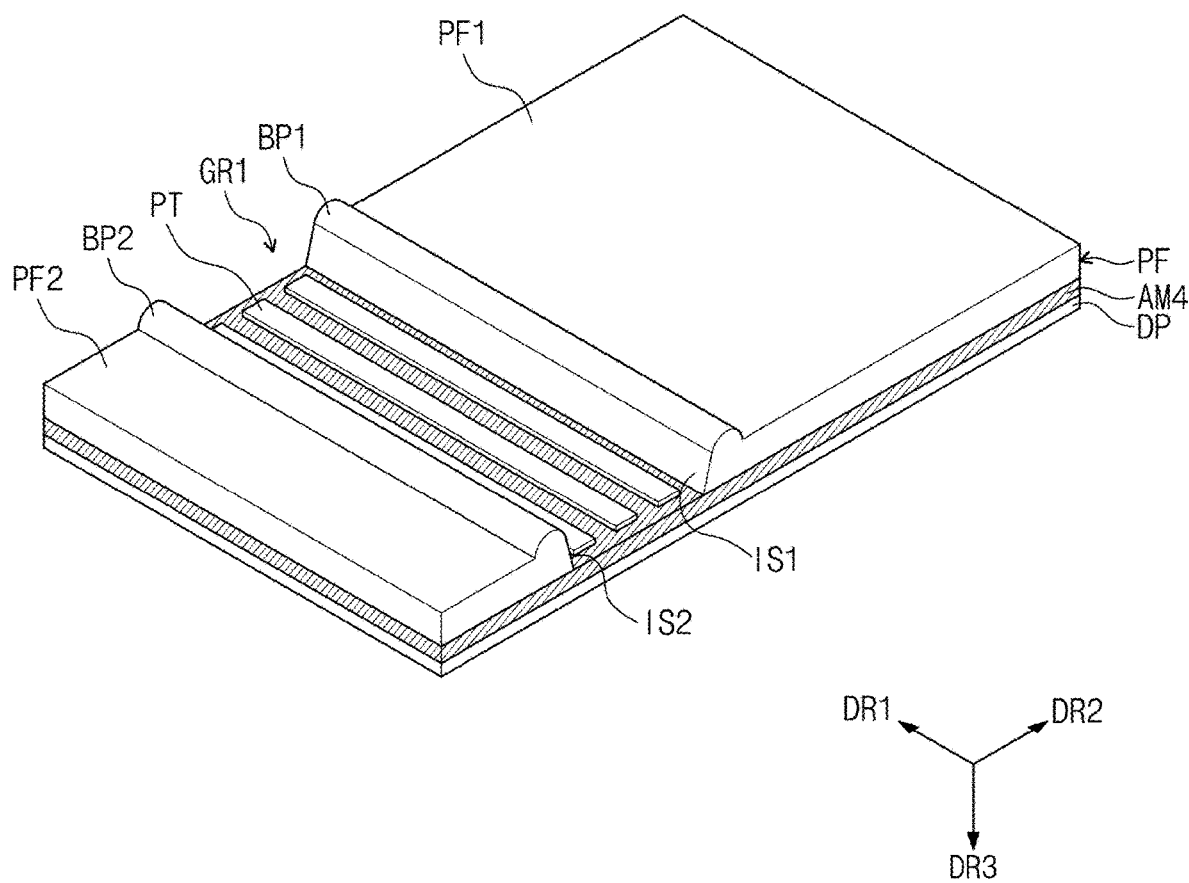
FIG. 4B is a rear perspective view illustrating an exemplary embodiment a display module according to the invention.

FIG. 4A is a cross-sectional view illustrating still an exemplary embodiment of a display module according to the invention, and FIG. 4B is a rear perspective view illustrating still an exemplary embodiment of a display module according to the invention. Hereinafter, shapes of patterns PT will be described.

Referring to FIGS. 4A and 4B, patterns PT may extend in the first direction DR1 and may be spaced apart from each other in the second direction DR2. The patterns PT according to this exemplary embodiment may reduce stress that occurs at signal lines corresponding to the curvature area CA of the display panel DP in the process of bending the display panel DP.

Figure 5A:
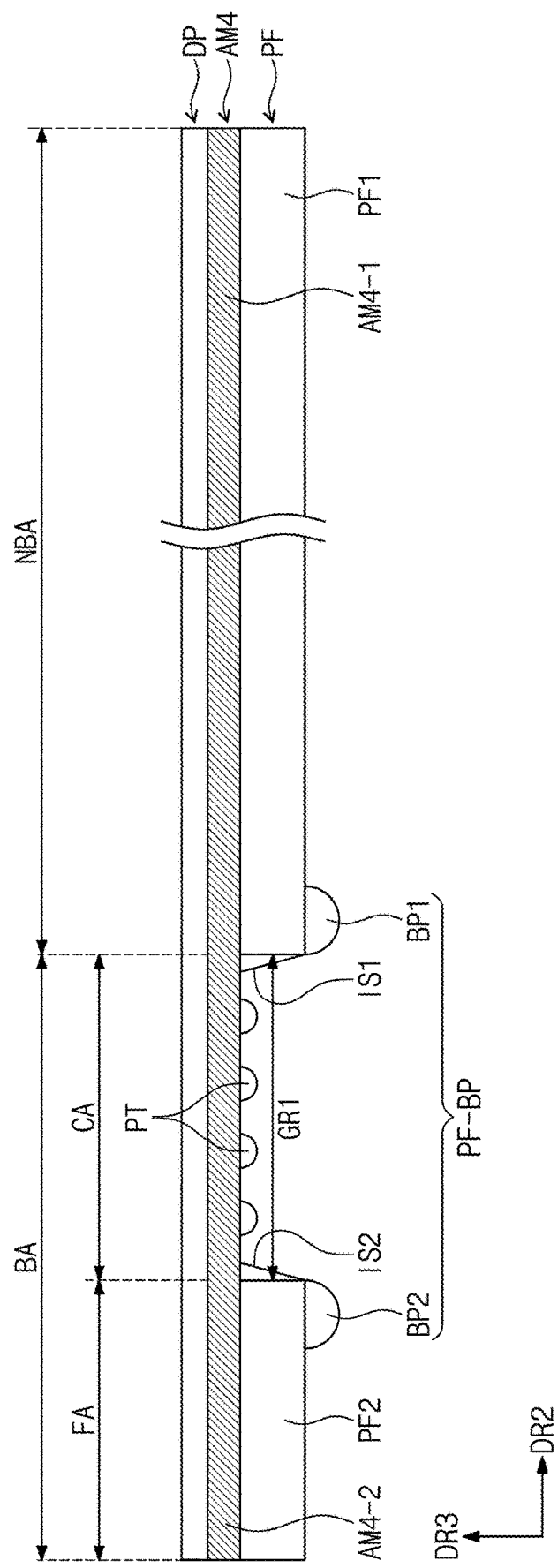
FIG. 5A is a cross-sectional view illustrating an exemplary embodiment a display module according to the invention.
Figure 5B:
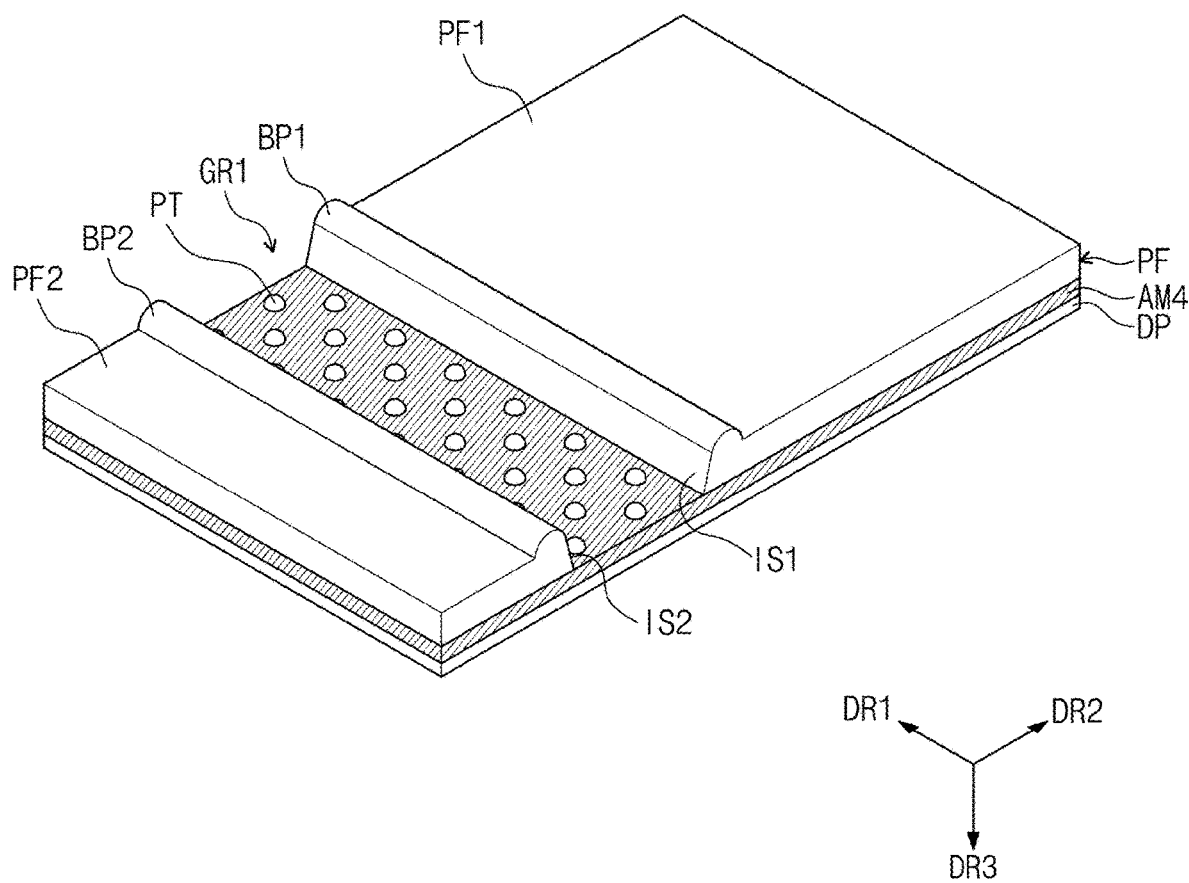
FIG. 5B is a rear perspective view illustrating an exemplary embodiment a display module according to the invention.

FIG. 5A is a cross-sectional view illustrating still an exemplary embodiment of a display module according to the invention, and FIG. 5B is a rear perspective view illustrating still an exemplary embodiment of a display module according to the invention.

Referring to FIGS. 5A and 5B, patterns PT may have hemispherical shapes. However, shapes of the patterns PT according to the invention are not limited thereto. In certain exemplary embodiments, the patterns PT may have polygonal three-dimensional shapes. The patterns PT according to this exemplary embodiment may reduce stress that occurs at signal lines corresponding to the curvature area CA of the display panel DP in the process of bending the display panel DP.

Figure 6B:
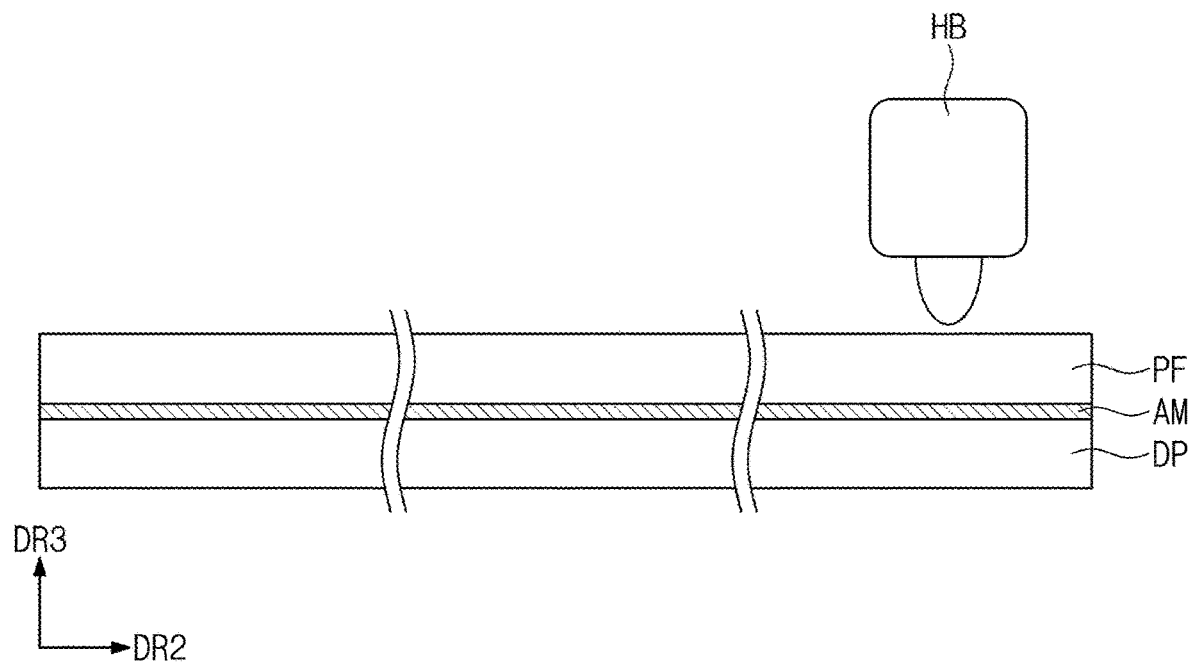
FIGS. 6B and 6C are side views illustrating an exemplary embodiment a method of manufacturing a display device according to the invention.
Figure 6C:
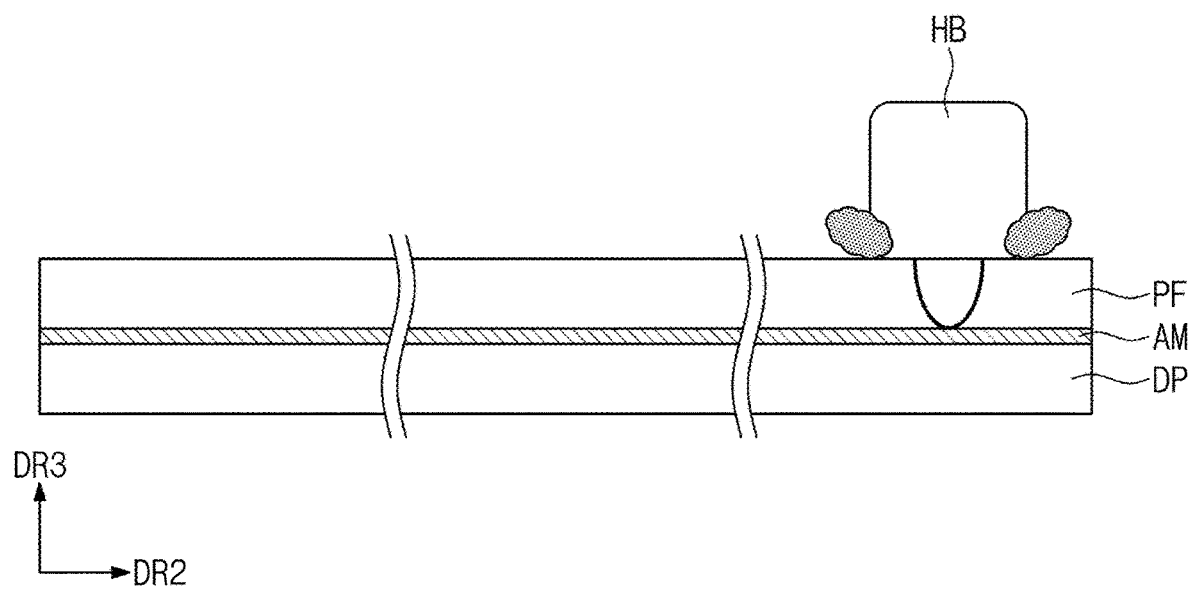

FIG. 6A is a rear perspective view illustrating an exemplary embodiment of a heating block according to the invention, and FIGS. 6B and 6C are side views illustrating an exemplary embodiment of a method of manufacturing a display device according to the invention.

Figure 6D:
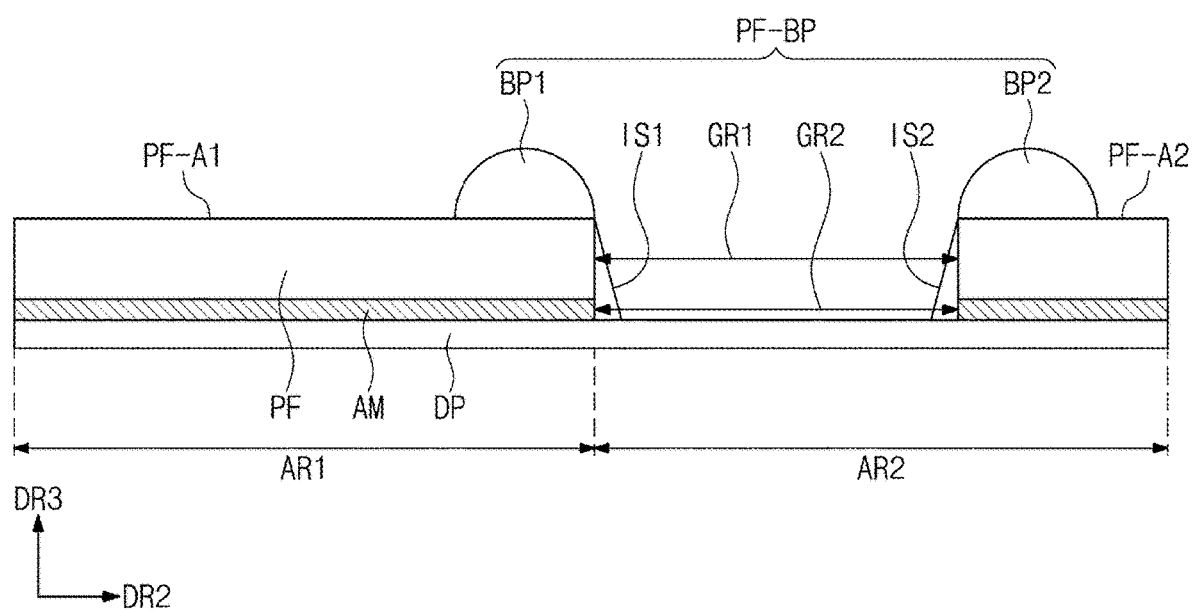
FIG. 6D is a cross-sectional view illustrating an exemplary embodiment of a display device in a process illustrated in FIG. 6C.

FIG. 6D is a cross-sectional view illustrating an exemplary embodiment of a display device in a process illustrated in FIG. 6C.

The heating block HB illustrated in FIG. 6A may include a metal pillar having a bar shape. The heating block HB may include stainless steel having excellent strength and durability or may include aluminum or copper having high thermal conductivity. A length of the heating block HB in an extending direction (e.g., DR1) of the heating block HB may be longer or shorter than a length of the display device DD (see FIG. 2A) in the first direction DR1.

As illustrated in FIG. 6B, the heating block HB is aligned with a preliminary display device The preliminary display device may be the display device DD may be described with reference to FIGS. 2A to 2C. However, in the preliminary display device, the protective film PF covers an entire portion of the rear surface of the display panel DP and a groove is not defined yet. The heating block HB is heated to a predetermined temperature after being aligned with the preliminary display device.

As illustrated in FIG. 6C, the heating block HB presses the protective film PF to remove a portion of the protective film PF. The heating block HB may press the protective film PF in a state in which the heating block HB is heated to a temperature higher than or equal to a sublimation temperature of the protective film PF. In an exemplary embodiment, for example, when a PET film is used as the protective film PF, the heating block HB may be heated to a temperature higher than 250 degrees Celsius to be used in this process.

A maximum temperature of the heating block HB may be set in consideration of the base layer BL of the display panel DP. The heating temperature of the heating block HB may be set as a temperature at which the protective film PF is sublimated but thermal damage of the base layer BL does not occur. When the base layer BL includes polyimide, the maximum heating temperature of the heating block HB may be lower than 600 degrees Celsius.

FIG. 6D illustrates the display device DD from which the heating block HB is removed. The protective film PF may include the first bump portion BP1 and the second bump portion BP2 which protrude from the first rear surface PF-A1 and the second rear surface PF-A2, respectively. The first and second bump portions BP1 and BP2 may be adjacent to the first groove GR1. While the protective film PF is sublimated, the plastic resin of the protective film PF may be accumulated on the first rear surface PF-A1 and the second rear surface PF-A2 of which temperatures are relatively low, and thus the first and second bump portions BP1 and BP2 may be formed.

In certain exemplary embodiments, even though not shown in the drawings, the bump portion PF-BP may be removed by a mechanical polishing process, a chemical polishing process, or a mechanical chemical polishing process.

The first and second inner side surfaces IS1 and IS2 of the protective film PF may be inclined with respect to the rear surface of the display panel DP. The first inner side surface IS1 and the second inner side surface IS2 may be linearly and/or nonlinearly inclined, and profiles of the first and second inner side surfaces IS1 and IS2 may be determined by the shape of the heating block HB.

An adhesive member AM by which a second groove GR2 is defined is illustrated as an example in FIG. 6D. Here, inner side surfaces of the adhesive member AM, which define the second groove GR2, may be covered by the protective film PF. Thus, the inner side surfaces of the adhesive member AM may not be exposed outward. The adhesive member AM in FIG. 6D may correspond to the fourth adhesive member AM4 described with reference to FIGS. 2A to 2E.

A sum of heights of the first and second grooves GR1 and GR2 in the third direction DR3 may correspond to a sum of a thickness of the adhesive member AM and a thickness of the protective film PF. The sum of heights of the first and second grooves GR1 and GR2 in the third direction DR3 may range from 50 μm to 100 μm. At this time, a height of the display panel DP in the third direction DR3 may range from 20 μm to 50 μm. A width of the first groove GR1 in the second direction DR2 may range from 1 mm to 2 mm.

Figure 6E:
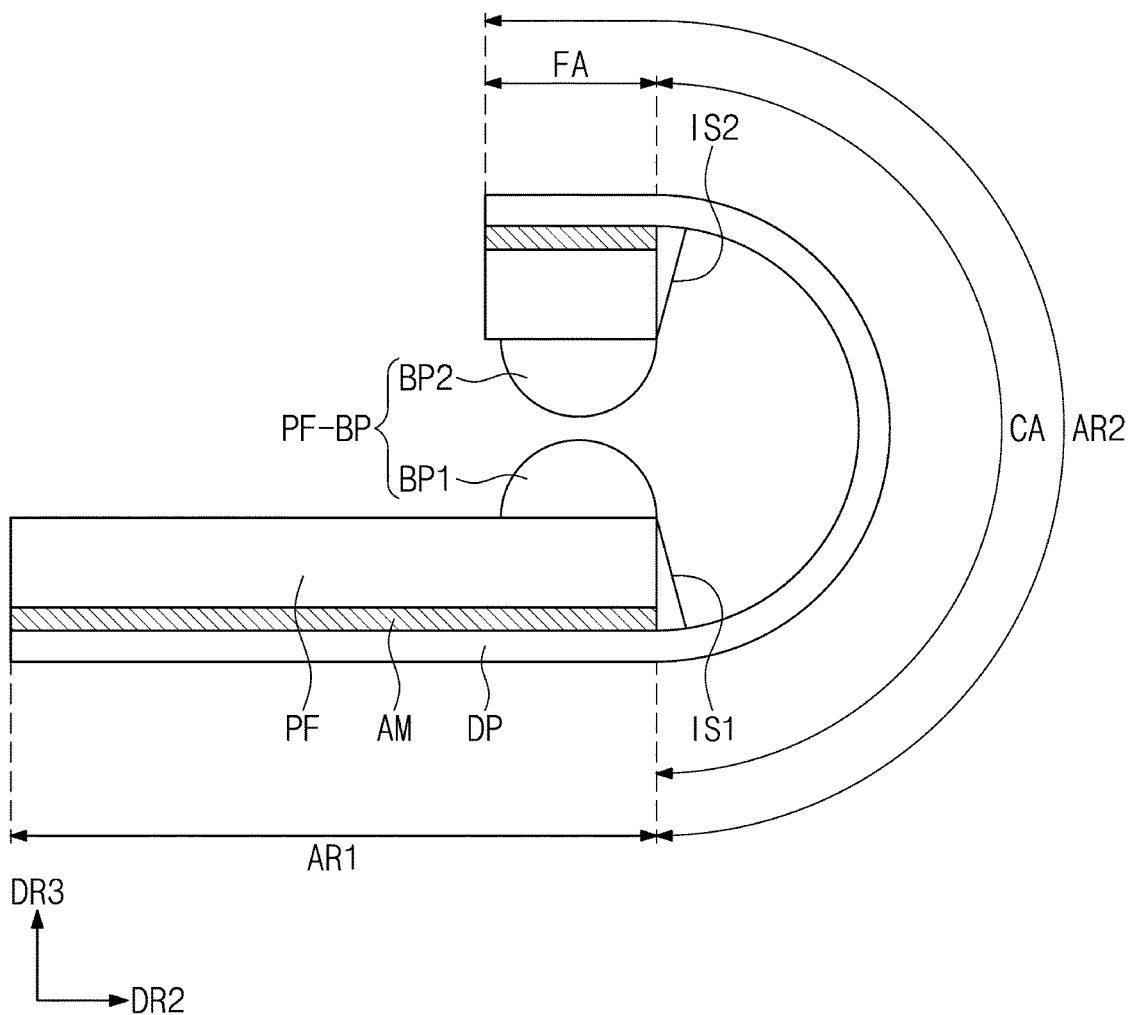
FIG. 6E is a cross-sectional view illustrating an exemplary embodiment of a bent display device according to the invention.

FIG. 6E illustrates a display device DD in a bent state. The display device DD may include a first area AR1 and a second area AR2 including a portion in which the first groove GR1 is defined. Here, the second region AR2 may correspond to the bending area BA illustrated in FIGS. 2A to 2E, and the first region AR1 may correspond to the non-bending area NBA illustrated in FIGS. 2A to 2E.

The display device DD is bent such that a portion corresponding to the first groove GR1 has a predetermined curvature. Here, the portion of the display device DD corresponding to the first groove GR1 may correspond to the curvature area CA illustrated in FIGS. 2A to 2E, and a remaining portion of the second area AR2 of the display device DD may correspond to the facing area FA illustrated in FIG. 2A to 2E.

Figure 7A:
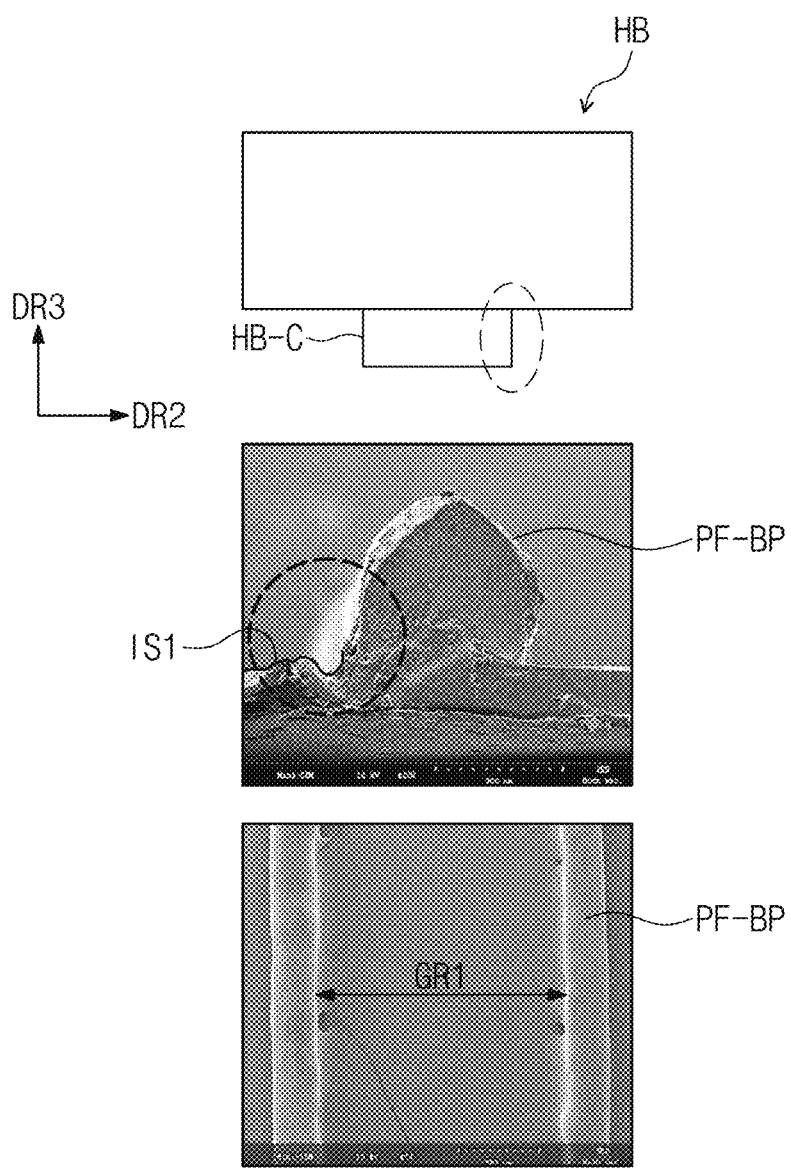
FIGS. 7A to 7C show images of bump portions of protective films formed using heating blocks having different shapes.
Figure 7B:
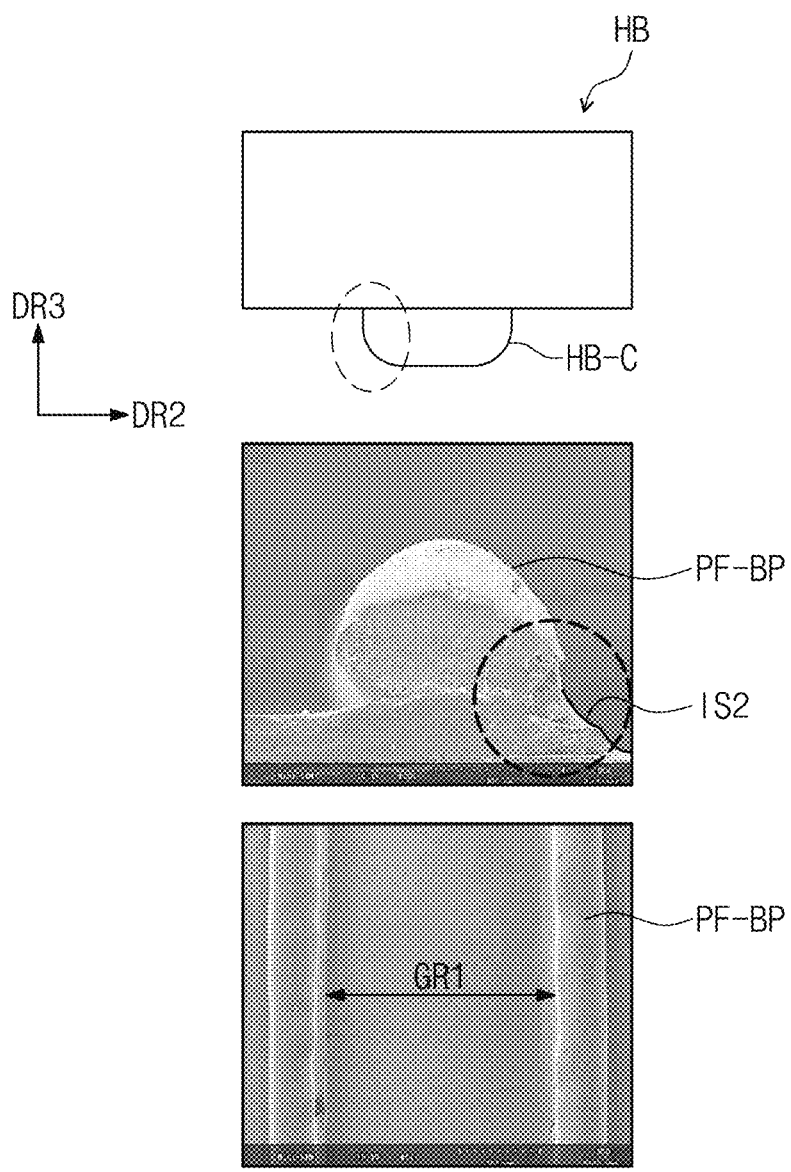
Figure 7C:
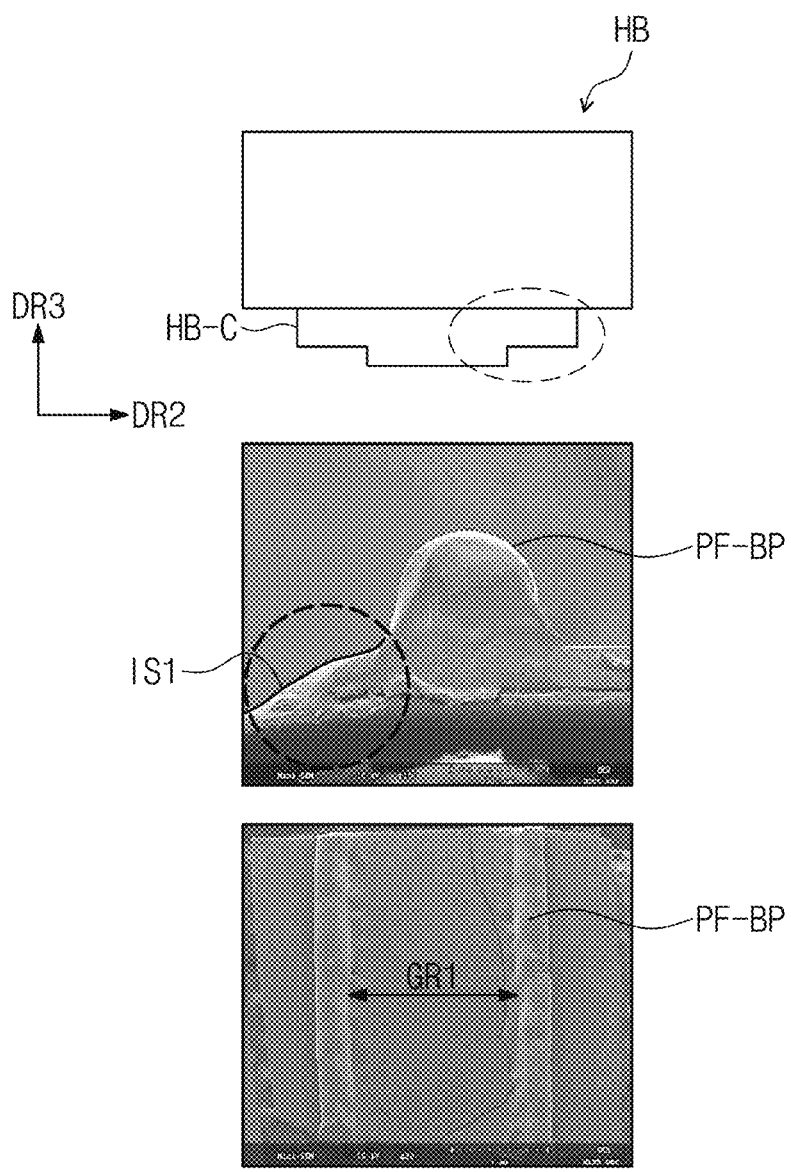
Figure 7D:
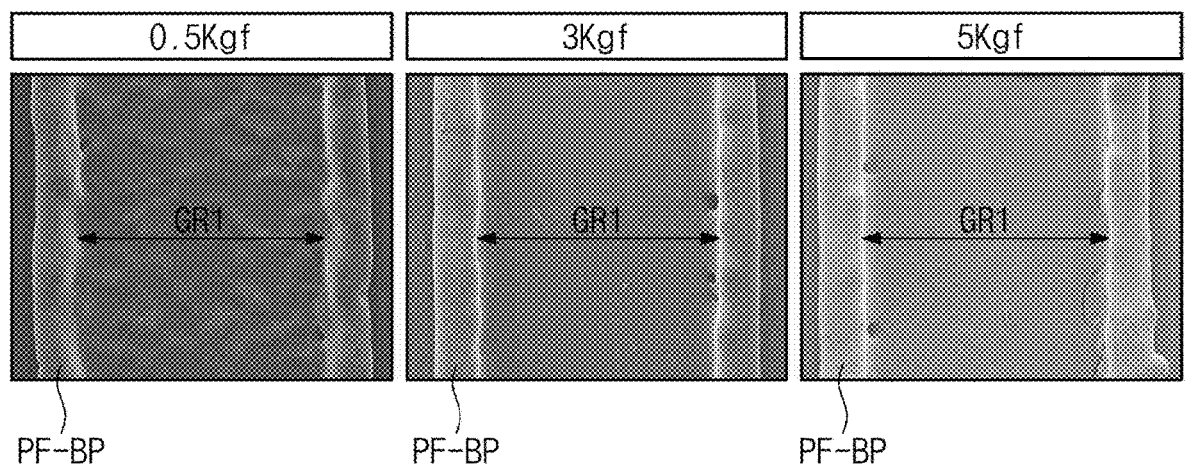
FIG. 7D shows images of grooves defined by protective films, formed in variously applied pressures of a heating block.
Figure 7E:
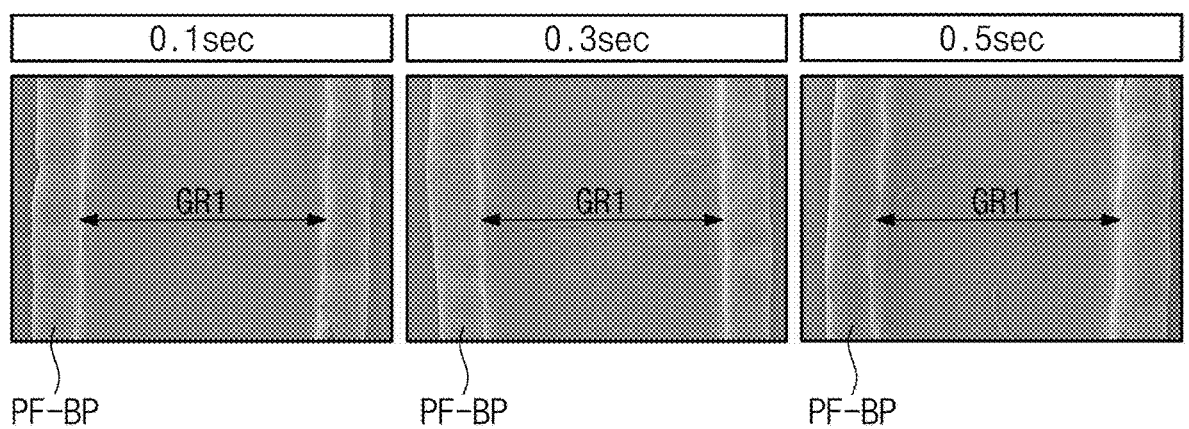
FIG. 7E shows images of grooves defined by protective films, formed in various contact times of a heating block.

FIGS. 7A to 7C show images of bump portions PF-BP of protective films PF formed using heating blocks HB having different shapes. FIG. 7D shows images of grooves GR1 defined by protective films PF, formed in variously applied pressures of a heating block HB. FIG. 7E shows images of grooves GR1 defined by protective films PF, formed in various contact times of a heating block HB.

FIGS. 7A to 7C show various images corresponding to a cross section, defined by the second direction DR2 and the third direction DR3, of the heating block HB of FIG. 6A. As illustrated in FIGS. 7A to 7C, the profiles of the first inner side surface IS1 and the second inner side surface IS2 may be changed depending on a cross-sectional shape of a contact portion HB-C of the heating block HB.

As illustrated in FIG. 7A, when the cross section of the contact portion HB-C of the heating block HB has a rectangular shape, a cross section of the first inner side surface IS1 may be inclined and may have a concave portion. As illustrated in FIG. 7B, when the cross section of the contact portion HB-C of the heating block HB has a curved portion, a cross section of the second inner side surface IS2 may have a curved line. As illustrated in FIG. 7C, when the cross section of the contact portion HB-C of the heating block HB has a stepped structure, a cross section of the first inner side surface IS1 may have a stepped shape.

As illustrated in FIG. 7D, a roughness of a bottom surface of the grooves GR1 and GR2 may be changed depending on the applied pressure of the heating block HB of the same shape. This is because a degree of removal of the protective film PF and the adhesive member AM is changed according to the applied pressure of the heating block HB. In an exemplary embodiment, the roughness of the bottom surface may be substantially constant when the applied pressure of the heating block HB is equal to or greater than 3 Kgf (kilogram-force).

FIG. 7E show images of grooves GR1 formed in various contact times of the heating block HB of the same shape. In an exemplary embodiment, in a contact time range of 0.5 sec or less, widths and heights of the bump portions PF-BP were substantially equal to each other even though the contact time is changed.

Figure 8:
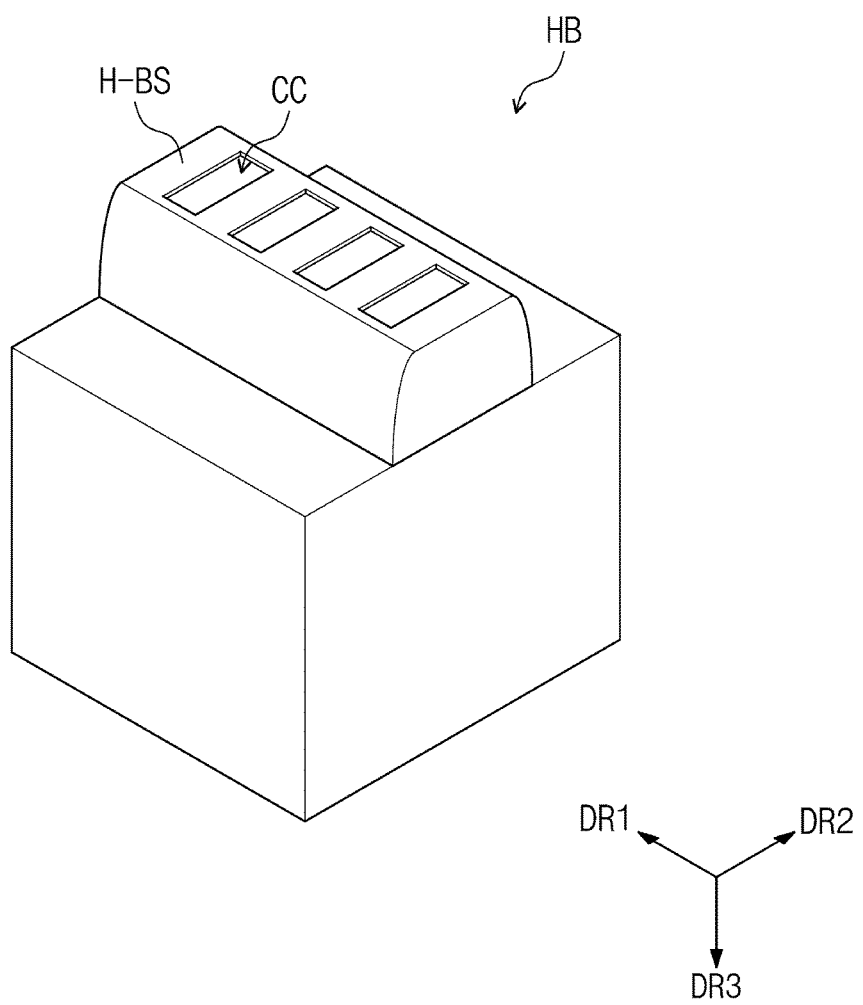
FIG. 8 is a front perspective view illustrating an exemplary embodiment of a heating block according to the invention.
Figure 9:
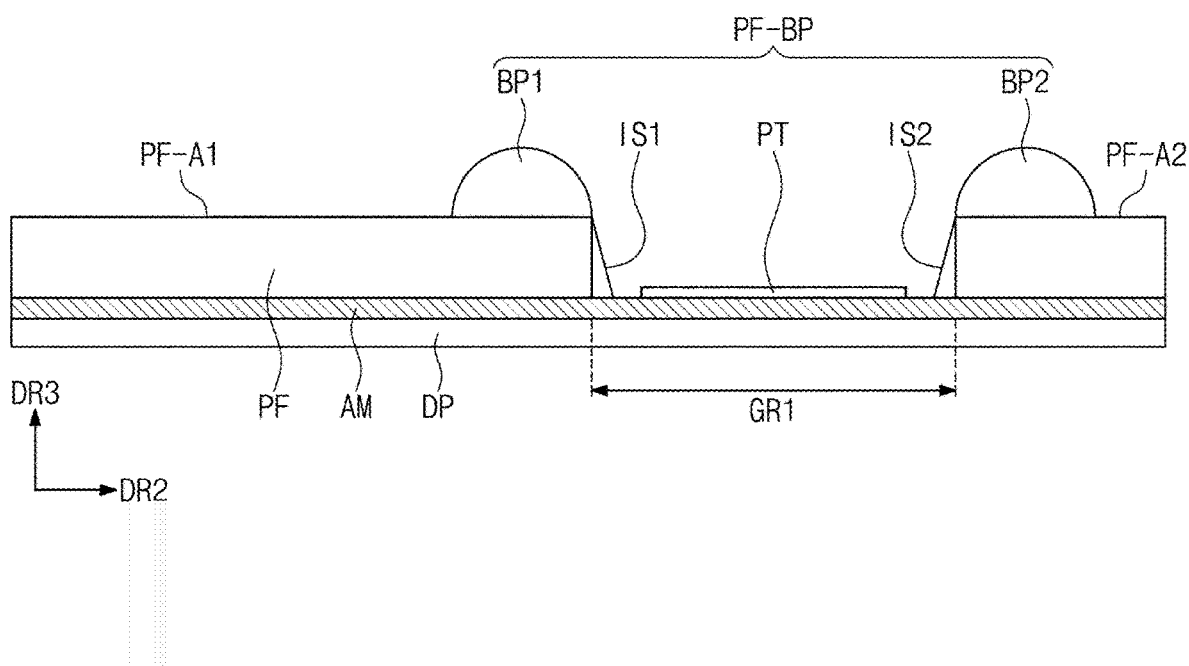
FIG. 9 is a cross-sectional view illustrating an exemplary embodiment of a display device manufactured using the heating block of FIG. 8.

FIG. 8 is a front perspective view illustrating an exemplary embodiment of a heating block according to the invention, and FIG. 9 is a cross-sectional view illustrating an exemplary embodiment of a display device manufactured using the heating block of FIG. 8.

Referring to FIG. 8, concave portions CC may be defined at a bottom surface H-BS of a contact portion HB-C of a heating block HB. The concave portions CC are defined as areas from which portions of the heating block HB in the third direction DR3 are removed.

The concave portions CC may have shapes and areas which correspond to those of the patterns PT (see FIGS. 3A to 5B). In FIG. 8, the concave portions CC extend in the second direction DR2 and are spaced apart from each other in the first direction DR1. However, in certain exemplary embodiments, the shapes of the concave portions CC may be variously modified.

As illustrated in FIG. 9, the protective film PF may be pressed by the heating block HB having the concave portions CC, and thus patterns PT corresponding to the concave portions CC may be formed.

In an exemplary embodiment of the invention, the protective film PF of a unitary body may be adhered to the rear surface of the display panel DP, and then, the protective film PF may be pressed by the heating block HB to form the first groove GR1. Thus, the process of the invention may be simplified as compared with a process of adhering the first protective film PF1 and the second protective film PF2, respectively.

The display device according to an exemplary embodiment of the invention can reduce the stress applied to the portion corresponding to the curvature area of the display panel.

In the method of manufacturing the display device according to an exemplary embodiment of the invention, a portion of an underlying film, which corresponds to the curvature area, may be processed using the heating block. Thus, the manufacturing processes can be simplified.

While the invention has been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A display device comprising:
    a display panel which includes a non-bending area and a bending area which is bendable from the non-bending area, wherein the bending area includes a curvature area having a predetermined curvature and a facing area facing the non-bending area in a bent state;
    a protective film disposed on a rear surface of the display panel and which includes a thermoplastic resin, wherein a first groove is defined by the protective film and corresponds to the curvature area; and
    an adhesive member disposed between the protective film and the display panel,
    wherein the protective film includes a first inner side surface and a second inner side surface that define the first groove, and
    wherein the first inner side surface and the second inner side surface are inclined,
    wherein a second groove is defined by the adhesive member, and corresponds to the curvature area, and inner side surfaces of the adhesive member defining the second groove are covered by the inclined first inner side surface and the second inner side surface of the protective film.

2. The display device of claim 1, wherein a rear surface of the protective film includes a first rear surface and a second rear surface, and the first groove is defined therebetween, and
    wherein the protective film includes a bump portion that protrudes from the first rear surface and the second rear surface adjacent to the first groove.

3. The display device of claim 1, wherein a portion of the rear surface of the display panel, which corresponds to the curvature area, is exposed outward.

4. The display device of claim 1, wherein a portion of a rear surface of the adhesive member, which corresponds to the curvature area, is exposed outward.

5. The display device of claim 1, further comprising at least one pattern disposed on the portion, corresponding to the curvature area, of the rear surface of the adhesive member.

6. The display device of claim 5, wherein a thickness of the at least one pattern ranges from about 20 percent to about 40 percent of a thickness of the protective film.

7. The display device of claim 5, wherein the first groove extends in a first direction,
wherein the at least one pattern is provided in plurality,
wherein each of the plurality of patterns extends in a second direction perpendicular to the first direction in a stretched-out state, and
wherein the patterns are spaced apart from each other.

8. The display device of claim 5, wherein the first groove extends in a first direction,
wherein the at least one pattern is provided in plurality,
wherein each of the plurality of patterns extends in the first direction, and
wherein the patterns are spaced apart from each other.

9. The display device of claim 5, wherein the at least one pattern has a hemispherical shape.

10. The display device of claim 1, wherein the thermoplastic resin includes polyethylene terephthalate (PET).

11. A method of manufacturing a display device, the method comprising:
providing a preliminary display device that comprises a display panel including a first area and a second area connected to the first area, an adhesive member disposed on a rear surface of the display panel, and a protective film disposed on a rear surface of the adhesive member; and
pressing the protective film using a heating block and removing a partial region of the protective film, which corresponds to a portion of the second area, wherein the second area is bendable,
wherein the first area is non-bendable, and the second area is bendable from the first area, wherein the second area includes a curvature area having a predetermined curvature and a facing area facing the first area in a bent state,
wherein the protective film includes a thermoplastic resin,
wherein a first groove is defined by the partial region removed from the protective film and corresponds to the curvature area, wherein the protective film includes a first inner side surface and a second inner side surface that define the first groove, wherein the first inner side surface and the second inner side surface are inclined, and
wherein a second groove is defined by the adhesive member and corresponds to the curvature area, wherein inner side surfaces of the adhesive member defining the second groove are covered by the inclined first inner side surface and the second inner side surface of the protective film.

12. The method of claim 11, wherein the protective film includes a thermoplastic resin, and
wherein the heating block is heated to a temperature higher than or equal to a sublimation temperature of the thermoplastic resin.

13. The method of claim 11, wherein pressing the protective film using the heating block comprises forming a bump portion protruding from a rear surface of the protective film adjacent to the groove.

14. The method of claim 13, further comprising:
removing the bump portion.

15. The method of claim 13, wherein a concave portion is defined at a bottom surface of the heating block, which comes in contact with a region in which the protective film is pressed.

16. The method of claim 15, wherein pressing the protective film further comprises forming a pattern corresponding to the concave portion on the rear surface of the adhesive member.

17. The method of claim 11, wherein pressing the protective film comprises removing a partial region, of the adhesive member, which corresponds to the portion of the second area.

18. The method of claim 11, the facing area faces the first area in a thickness direction of the display panel.

* * * * *